(12) United States Patent
Gazit

(10) Patent No.: US 7,031,348 B1
(45) Date of Patent: Apr. 18, 2006

(54) APPARATUS AND METHOD OF SPLICING DIGITAL VIDEO STREAMS

(75) Inventor: Hillel Gazit, Palo Alto, CA (US)

(73) Assignee: Optibase, Ltd., Herzlia (IL)

( * ) Notice: Subject to any disclaimer, the term of this patent is extended or adjusted under 35 U.S.C. 154(b) by 0 days.

(21) Appl. No.: 09/055,156

(22) Filed: Apr. 4, 1998

(51) Int. Cl.
*H04J 3/06* (2006.01)

(52) U.S. Cl. ............... 370/504; 370/509; 370/516; 370/520; 375/363; 375/365; 348/423.1; 348/500

(58) Field of Classification Search ............... 370/530, 370/504, 509, 516, 520, 229, 468, 471, 476, 370/486, 487, 315, 412, 413, 465; 375/363, 375/365, 240, 295, 316; 348/9, 473, 722, 348/500, 515, 423
See application file for complete search history.

(56) References Cited

U.S. PATENT DOCUMENTS

| | | | |
|---|---|---|---|
| 3,979,771 A * | 9/1976 | Taggart, Jr. et al. | 360/42 |
| 5,864,682 A * | 1/1999 | Porter et al. | 370/468 |
| 5,880,792 A * | 3/1999 | Ward et al. | 348/722 |
| 5,917,830 A * | 6/1999 | Chen et al. | 370/487 |
| 5,982,436 A * | 11/1999 | Balakrishnan et al. | 375/240.05 |
| 6,029,045 A * | 2/2000 | Picco et al. | 348/9 |
| 6,034,746 A * | 3/2000 | Desai et al. | 348/423 |
| 6,038,000 A * | 3/2000 | Hurst, Jr. | 375/240.26 |
| 6,049,569 A * | 4/2000 | Radha et al. | 375/240 |
| 6,058,109 A * | 5/2000 | Lechleider | 370/352 |
| 6,101,195 A * | 8/2000 | Lyons et al. | 370/498 |
| 6,137,834 A * | 10/2000 | Wine et al. | 375/240 |
| 6,181,383 B1 * | 1/2001 | Fox et al. | 348/423 |
| 2002/0154694 A1 * | 10/2002 | Birch | 375/240.05 |

FOREIGN PATENT DOCUMENTS

| | | | |
|---|---|---|---|
| EP | 0742674 A | | 11/1996 |
| EP | 0 755 157 A | | 1/1997 |
| EP | 837609 A | | 4/1998 |
| WO | WO 97/45965 | | 4/1997 |
| WO | WO 99/14955 | | 3/1999 |

OTHER PUBLICATIONS

Shiu, J., et al., "A Low-Cost Editor for MPEG-1 System Streams," IEEE Transactions on Consumer Electronics, vol. 41, No. 3, 1995, pp. 620-625.

(Continued)

*Primary Examiner*—Dang Ton
*Assistant Examiner*—Shick Hom
(74) *Attorney, Agent, or Firm*—Pillsbury Winthrop Shaw Pittman LLP

(57) ABSTRACT

A splicing system includes a splicer for seamlessly splicing togther digitally encoded data streams. In a preferred embodiment, the splicer preferably parses successive splice buffers of data stream data for a splice-out point and a splice-in point, closing an initial group of pictures GOP if needed. The preferred splicer further finds a new data stream real-time program clock reference PCR value for aligning new data stream decode/presentation, and aligns the new data stream start time. Concurrently, the splicer preferably uses a frame table to detect overflow and corrects such overflow by adding null packets, thereby delaying portions of data stream data. The splicer also preferably restores data stream encoding by deleting null packets, and thereby accelerating a portion of data stream data. In a further preferred embodiment, the splicer preferably uses a bit-clock schedule offset to delay or accelerate portions of data stream data.

21 Claims, 23 Drawing Sheets

OTHER PUBLICATIONS

Hedtke, R., et al., "Schnittbearbeitung Von MPEG-2-Codierten Videosequenzen," Fernseh und Kinotechnik, DEE, VDE Verlag GmbH, Berlin, vol. 50, No. 7, pp. 367-373.

Fischbacher, M.; "Der MPEG-2-Transportstrom Unter Der 'Logistik-Lupe;", Fernseh und Kinotechnik, vol. 51, No. 7, Jul. 1, 1997, pp. 409-414.

* cited by examiner

APPARATUS AND METHOD OF SPLICING DIGITAL VIDEO STREAMS

FIELD OF THE INVENTION

The present invention relates generally to multimedia data stream processing and, more particularly to apparatus and methods for splicing together digitally-encoded multimedia data streams.

BACKGROUND OF THE INVENTION

Multimedia creation, processing and delivery systems are rapidly appearing, fueled by technological advances and early standardization efforts. For example, improved processing and storage, transmission, encoding/decoding and other technologies are facilitating a shift from analog to digital broadcasting (i.e. television, cable, satellite and other distribution of digitized, and often digitally processed, multimedia data streams). Early standardization is further providing for interoperability and thus, less expensive, more readily available systems and components. Among the anticipated advantages of this shift are consumer access to a greater variety of higher quality programming and a high quality mass distribution medium for commercial industries.

Standards for encoding and decoding data streams comprising audio, video, other multimedia and non-multimedia information, include the internationally adopted MPEG-1 (ISO/IEC 11172-n) and MPEG-2 (ISO/IEC 13818-n) specifications, as espoused by the Motion Picture Experts Group. (MPEG-2 expands on MPEG-1 for broadcast-quality video and other applications.) Among other features, encoding/decoding specifications such as MPEG-1 and MPEG-2 (hereinafter collectively referred to as "the MPEG specifications") prescribe an array of data stream format, timing, synchronization and device capability parameters essentially independently hardware/software system implementations. Stated alternatively, the MPEG specifications prescribe specific protocols and capabilities while allowing essentially unrestricted (and hopefully, continually advancing) systems for implementing the prescribed protocols and capabilities.

The MPEG specifications and other encoding/decoding standards have also been expanded to incorporate other emerging technologies. For example, the Audio Extension standard (ISO/IEC 13818-7) adds an AC-3 audio mode to MPEG-2. Further extensions within the MPEG-specifications have also been discussed, introduced and/or adopted as international standards for handling, facilitating and/or expanding the utility of data encoding, decoding, transmission and related issues. The MPEG specifications are hereby fully incorporated herein by reference as if repeated verbatim immediately hereinafter.

Unfortunately, while providing a growing common platform for achieving the above goals, the MPEG and related specifications are necessarily drafted, at least in part, through hindsight review of recent developments. Thus, despite revisions and expansions, they are also necessarily deficient with regard to certain unforeseen applications and other contingencies. MPEG-2, for example, failed to anticipate the growing requirements for complete digitally-encoded data stream splicing ("splicing") support. Broadly stated, digitally-encoded data stream splicing involves appending a new data stream to a selected point in an existing data stream, thereby replacing the existing data stream at the splice point. With respect to broadcast media, splicing can be broadly viewed as switching from a currently broadcast data stream to a new data stream. For example, a need might exist for inserting a separately encoded commercial message into an ongoing movie broadcast (requiring a splice at the start of the commercial and a further splice back to the movie at the end of the commercial), among other applications.

The difficulties associated with splicing together digitally encoded data streams are more easily understood by comparison with the more straight forward tasks of splicing together analog or even non-encoded digital data streams. For example, non-encoded data streams are typically transmitted, received, buffered by a receiver and displayed in the same order. Further, each individually-presented data portion or "frame" of a non-encoded data stream typically contains a similar, if not identical, amount of data. Splicing together two analog data streams or two non-encoded digital data streams therefore essentially involves switching from one stream source to a second data stream source at a readily determinable frame boundary. Systems and methods for performing such splicing are also well known in the art.

In contrast, frames of a digitally encoded data stream are typically received by a decoder in a different order than they are displayed. In fact, different encoders typically produce data streams having vastly different frame and informational characteristics. Further, a primary goal of encoding is to compress the data stream so that the data stream will require less transmission bandwidth and less storage space, among other advantages.

Thus, an MPEG-2 encoded video data stream will contain only a limited number of frames containing complete data for independently re-creating a corresponding image (commonly referred to as "I" frames); other frames, commonly referred to as predicted frames ("P-frames") and bidirectional frames ("B-frames"), contain a lesser, variable amount of reference data for re-creating a video image by comparison with previously decoded frames. In addition, each data stream must be encoded such that (during decoding) a decoder buffer will continuously contain a sufficient number of frames for continuous decoding, but not so many frames as to overflow the decoder buffer.

Splicing together digitally encoded data streams is further complicated by the independent nature of each encoded data stream. In addition to the independent form and synchronization data associated with each data stream, conventional encoder and decoder specifications fail to provide requisite timing or splice point parameters. Such difficulties are further exacerbated by the lack of data available for relating one stream to another. For example, no parameters are provided for directly and reliably determining the contents of a decoder buffer occupied by data from more than one stream. Thus, there is no direct support provided for assuring that a decoder buffer will contain a sufficient amount of data from each of two streams to be spliced together such that continuous data flow will be sustained and the buffer will not underflow or overflow.

Despite the above and other difficulties relating to splicing together encoded data streams, solutions have been proposed, two of which are already in use. One conventional solution is to decode the subject data streams, perform the splice in decoded form and then re-encode the data streams as a single data stream, thereby effectively avoiding the inherent problems of splicing encoded data streams altogether. Unfortunately, encoding and decoding hardware that is sufficiently robust to perform the splice in real time is also expensive. In broadcasting applications, each "television channel" is provided by a separate data stream source, any one of which might well require splicing. Therefore, replacement of multiple encoders and decoders will likely be required.

According to another conventionally utilized method for splicing encoded data streams, blackened and muted video frames ("leader frames") are appended to the start of the new data stream. Among the advantages of this method is that a minimal amount of data is required to produce the leader frames. Therefore, decoder buffer overflow will not occur. In addition, the leader frames act to mask visual artifacts resulting from a less than precise splicing of a data stream pair, such as a loss of display synchronization commonly referred to in the art as rollover. Further, such a method can be performed using existing encoders and decoders, thereby avoiding replacement costs. Unfortunately, the splice is not transparent. Blackened frames are noticeable to a consumer presented with the displayed data stream. Since the leader frames form a part of a new stream, such as a commercial message, the lost "air time" is of particular concern to the advertiser who may pay in excess of $900,000.00 for a 30 second commercial. (Each frame might therefore cost in excess of $1,000.00.)

Despite these attempts, standardization efforts currently under proposal by the Society of Motion Pictures and Television ("Proposed SMPTE Standard for Television—Splice Points for MPEG-2 Transport Streams"), suggest abandonment of current splicing methodologies in favor of a new extension to the MPEG-2 specifications. The proposal suggests a new, integrated protocol directed specifically at performing transparent or "seamless" splicing of a data stream pair. Broadly stated, the proposed standard provides for incorporation of splice points and related splicing-support information directly into the data stream at the time of encoding. Unfortunately, the proposed extensions will at least require the expense of replacing existing encoders. To make matters more difficult, the proposed standard is not yet ratified. Therefore, potential modifications, as well as inevitable varied interpretations, implementations, incompatibilities, proprietary "further extensions" and other issues are likely to arise.

Accordingly, there is a need for an apparatus and methods for splicing together digitally encoded multimedia data streams without requiring new encoders or decoders, and without introducing noticeable and air-time consuming artifacts. There is further a need for such apparatus and methods that avoid a requirement for modification of conventional encoding/decoding specifications.

SUMMARY OF THE INVENTION

The present invention provides a data processing system-based splicing system for seamlessly splicing together digitally encoded data streams. More specifically, the present splicing system performs splicing of an old data stream and a separately encoded new data stream using conventional encoders and decoders, in accordance with existing encoding/decoding specifications and while avoiding the expense, visual artifacts and lost air time attributable to conventional splicing systems.

Accordingly, a first preferred embodiment of the present invention comprises a splicer which functions as a library within a larger MPEG-2 data stream processing and broadcasting system. The splicer further functions in direct or indirect communication with a host application and a multiplexer of the larger system. In addition, several splicers can be invoked simultaneously for splicing together data streams stored within a host processing system and/or externally for simultaneous transmission as multiplexed MPEG-2 data stream channels.

Advantageously, the splicer adjusts the data streams without requiring decoding during splicing either to align the data streams or to close an open group of pictures ("GOP") at the splice-in point of the new data stream. The splicer further adjusts the new data stream such that overflowing and underflowing of a receiving decoder input buffer due to splicing is avoided. Still further, the splicer enables the advantage that, upon completion of splicing, the remainder of the new data stream can be received as encoded without further splicer intervention.

When invoked by a library call from the host application, the preferred splicer receives setup information including the location of a corresponding splice buffer-N, splice-in only or insert mode selection, audio option selection and the number of splice buffer fulls or "splice buffers" preceding the desired old data stream portion within which a splice is to be conducted. Thereafter, the splicer performs a splice using old data stream data followed by new data stream data that is sequentially placed in splice buffer-N.

A preferred splicer operates by creating a splice table and then parsing each splice buffer in splice buffer-N to perform discrete tasks and concurrent ongoing tasks. The discrete tasks include creating a splice table, finding splice-out and splice-in points, determining a new data stream transmission time and aligning receipt of the new data stream with decoding a last decoder buffer of the old data stream. The ongoing tasks included populating the splice table with data stream frame information and, also concurrently, using the frame information to avoid decoder input buffer overflow without altering post splice data stream encoding.

In order to align data stream receipt and avoid or "correct" overflow, the splicer delays and accelerates different portions of the new data stream. More specifically, the splicer delays data stream receipt by inserting null packets before the start of the data stream and accelerates data stream receipt by deleting null packets from the start of the data stream. Similarly, the splicer delays overflow-causing data packets by inserting null packets before such data packets and accelerates later data packets (to reset encoded timing) by deleting null packets from the later data packets. Addition of null packets is effectuated by returned instructions to the host application, which performs the addition and routes the result to the multiplexer for multiplexing and transmission. Delays are effectuated by the splicer directly, using a repeated copy operation to shift data packets within splice buffer-N.

In a further preferred embodiment, data stream portion delays and accelerations are effectuated through the use of a novel bit clock mechanism. In one aspect, rather than performing each repeated copy null packet deletion and each null packet insertion discretely, a null packet count is maintained until a processing of a current data stream portion is completed. In a second aspect, the multiplexer is set to gather each data stream output buffer for transmission according to a fraction of the multiplexer operating rate. A splicer then determines null packet addition or deletion amounts for a given buffer and returns these amounts to the host application. The host amount to its schedule for the corresponding buffer. Advantageously, since repeated copying and host application operations are avoided, processing system throughput can be significantly increased.

These and other objects, advantages and benefits of the present invention will become apparent from the drawings and specification that follow.

DETAILED DESCRIPTION OF THE PREFERRED EMBODIMENTS

For clarity sake, the embodiments discussed herein will be directed primarily toward splicing together digitally encoded data streams ("data streams") that are encoded and decoded in accordance with the MPEG-2 specifications. More specifically, the discussion will focus on real-time splicing of an ongoing television program broadcast with a commercial message, the splicing being conducted at a cable broadcasting station for transmission to cable receivers at consumer locations. The discussion will further be directed toward a splicer application program that is embedded within a preferred system for receiving, preparing, storing, retrieving and transmitting digitally encoded multimedia data streams.

It will be understood by those skilled in the art, however, that many digital encoding/decoding specifications exist and are being introduced (in addition to the MPEG specifications) to which the present invention is readily applicable. Examples include, but are not limited to the European Telecommunications Standard. Further, the content of the subject data streams is in no way limited to television programming and commercials. Rather, the teachings contained herein are applicable to a broad range of audio, video and other data types with which digital encoding is utilized.

Figure 1:
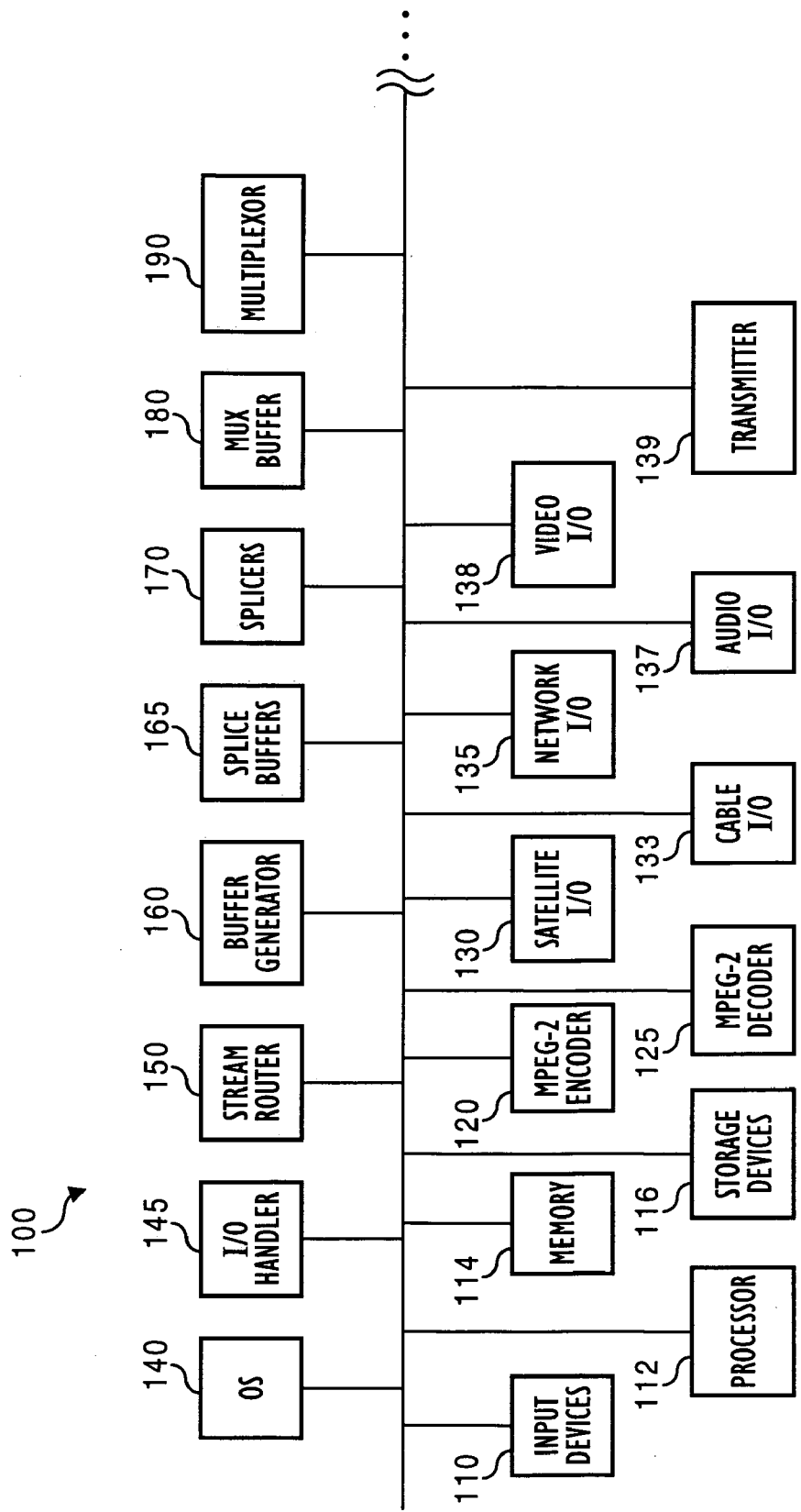
FIG. 1 is functional block diagram generally illustrating a system for receiving, preparing, storing, retrieving and transmitting digitally encoded multimedia data streams according to a preferred embodiment of the invention.

As is generally illustrated in FIG. 1, a preferred system 100 for receiving, preparing, storing, retrieving and transmitting digitally encoded multimedia data streams according to the invention is preferably contained wholly within a host processing system, such as a personal computer or "PC". System 100 preferably comprises electrically coupled hardware elements including input devices 110, processor 112, memory 114, storage devices 116, MPEG-2 encoder 120, and MPEG-2 decoder 125, satellite I/O =130, cable I/O 133, network I/O 135, audio I/O 137, video I/O 138 and transmitter 139. System 100 further comprises coupled software elements including operating system 140, I/O handler 145, stream router 150, buffer generator 160, splice buffers 165, splicers 170, mux buffer 180 and multiplexer 190.

It will be apparent to those skilled in the art that several variations of system 100 elements are contemplated and within the intended scope of the present invention. For example, given processor and computer performance variations and ongoing technological advancements, hardware elements such as MPEG-2 encoder 120 and MPEG-2 decoder 125 may be embodied in software or in a combination of hardware and software. Similarly, software elements such as multiplexer 185 may be alternatively embodied in hardware or in a combination of hardware and software. Further, while connection to other computing devices is illustrated solely as network I/O 145, wired, wireless, modem and/or other connection or connections to other computing devices (including but not limited to local area networks, wide area networks and the internet) might be utilized. A further example is that the use of distributed processing, multiple site viewing, information forwarding, collaboration, remote information retrieval and merging, and related capabilities are each contemplated. Various operating systems and data processing systems can also be utilized, however at least a conventional multitasking operating system such as Windows95® or Windows NT® (trademarks of Microsoft, Inc.) running on an IBM® (trademark to International Business Machines) compatible computer, or a computer running a Unix-based operating system, are preferred and will be presumed for the discussion herein. Input devices 110 can comprise any number of devices and/or device types for inputting commands and/or data, including but not limited to a keyboard, mouse, and/or speech recognition.

Figure 2:
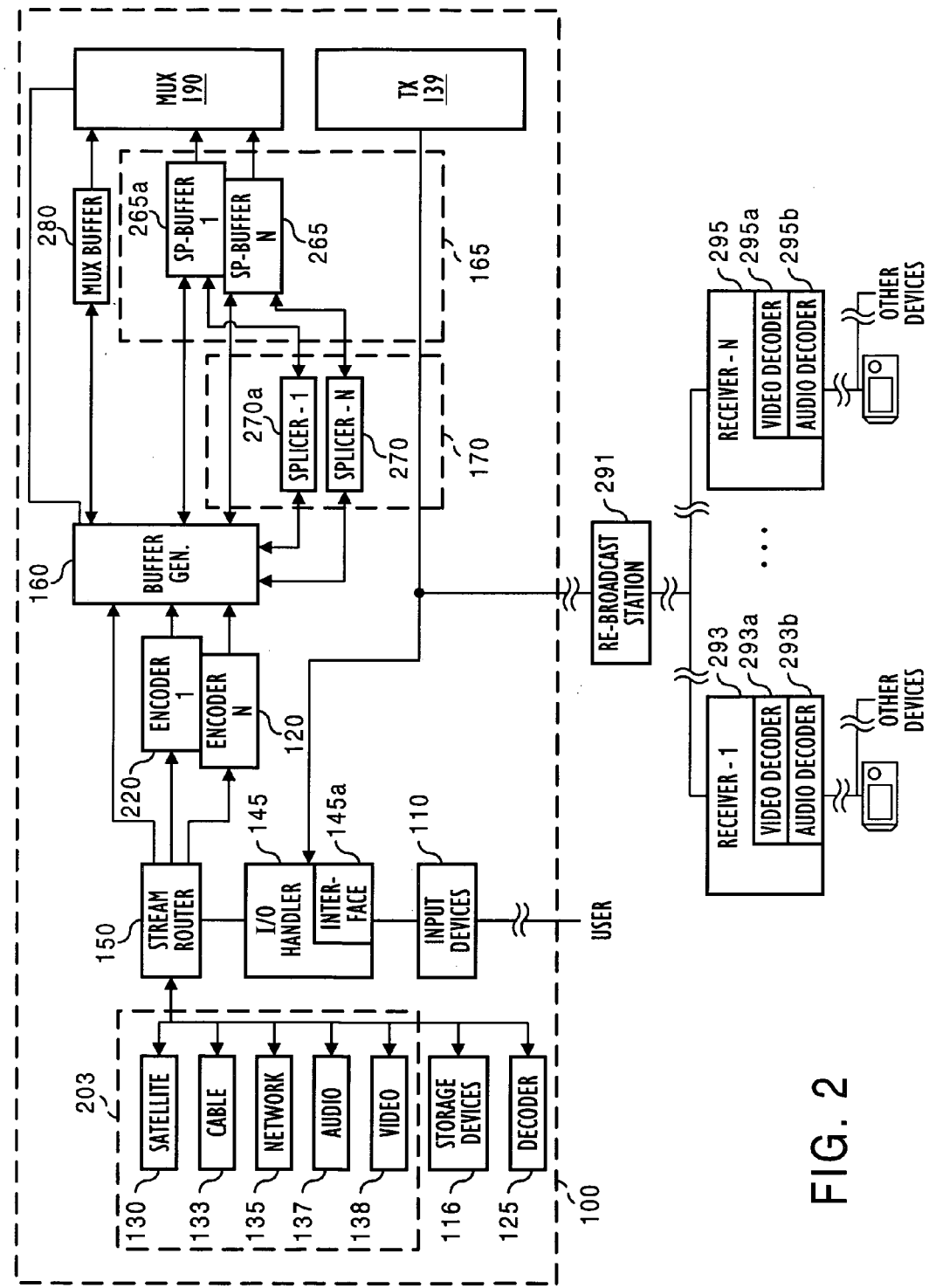
FIG. 2 is a functional block diagram illustrating in more detail the system shown in FIG. 1.

The FIG. 2 block diagram illustrates, in greater functional detail, how a splicer according to the invention preferably operates as a support application within system 100 of FIG. 1. Broadly stated, system 100 preferably operates in accordance with user selections to receive data streams from external sources and/or storage devices, perform MPEG-2 encoding on the data streams as needed, multiplex the encoded data streams and then transmit and/or store the multiplexed data streams (with or without prior decoding). When splicing is selected, system 100 preferably routes a currently transmitted ("old") data stream and a new data stream to a splicer. The splicer preferably modifies the data stream pair in real-time as needed such that, when added to the multiplexed data stream, the new data stream will be received, decoded and presented by a decoder as a seamlessly added continuation of the old data stream.

More specifically, a user preferably enters information and receives output in a conventional manner, using input devices 110, audio I/O 137 and video I/O 138 in conjunction with user-interface 145a of I/O handler 145. User-interface 145a is further preferably provided in a conventional manner in accordance with windows operating system specifications and practice. A user may, through user-interface 145a, select a number of data stream sources from those available (i.e. received) at I/O-interfaces 203 and/or data streams retrieved from storage devices 116. I/O-interfaces 103 include satellite interface 130 and cable interface 133 (i.e. transceiver expansion cards and/or embedded hardware and/or software for handling data streams transmitted via satellite and cable respectively), network interface 135, audio interface 137 and video interface 139. Those skilled in the art will appreciate that data stream sources and other options may be selected interactively by a user, according to default values and/or as timed and/or occurrence-driven scheduled selections.

During normal system 100 operation (i.e. in the absence of splicing), stream router 150 routes selected data streams according to the type of data stream. More specifically, stream router routes already-encoded data stream sources from I/O-interfaces 103 to buffer generator 160. Stream router 150 further routes not-encoded data streams, such as from storage devices 116, through a respective encoder (exemplified by encoder-1 220 and encoder-N 120) to buffer generator 160. Buffer generator 160 creates, upon receipt of an initiated data stream, an output buffer. For clarity sake, the output buffer created by buffer generator 160 during normal operation is referred to herein as a mux buffer (as exemplified by mux buffer-1 280). Having created a mux buffer, buffer generator 160 thereafter populates the mux buffer with data received from the corresponding I/O interface, and further sets a data-ready flag upon the filling a mux buffer and in accordance with MPEG-2 specification timing considerations. While a user can selectively determine the size of each respective mux buffer, a mux buffer size will typically range from approximately 64 kilobytes to 47×64 kilobytes, thereby providing at least 300 packets.

When splicing operation is selected, stream router 150 also routes the selected old and new data streams according to the type of data stream. More specifically, stream router 150 routes encoded data streams (again, typically from I/O interfaces 203) directly to buffer generator 160, and routes not encoded data streams (again, typically from storage devices 116, audio I/O 137 and video I/O 138), through an available encoder (e.g. encoder-1 220 to encoder-N 120) to buffer generator 160, as in normal operation. Buffer generator further creates an output buffer, as in normal operation. For clarity sake, however, the output buffer created by buffer generator 160 during splicing operation is referred to herein as a splice buffer (as indicated by exemplary splice buffers, splice buffer-N 265 and splice buffer-1 265a). Having created a splice buffer, buffer generator 160 thereafter populates the splice buffer with data stream data and launches a splicer (as indicated by exemplary splicers, splicer-N 270 and splicer-1 270a). A splicer is preferably a C+library launched by a library call from a buffer generator application portion of a host application program. The launched splicer effectuates the splice and returns values to the host application. The host application can then further manipulate data in the splice buffer prior to setting a status ready flag. Thus broadly stated, splicer-N 270 is preferably invoked and operates to parse through data stream data from an old data stream and new data stream pair (which is contained, one buffer-full at a time, in splice buffer-N 265), perform a splice and then return parameters to the host application. It should be noted that the host application fills splice buffer-N 265 approximately 0.5 to 1 second before the buffer will be received by multiplexer 190, thereby providing splicer-N 270 with at least 0.5 second to act on the data contained in the buffer.

During both normal and splicing operations, multiplexor 190 continuously cycles through a data-ready flag test for each of the output buffers and, upon detecting a ready status, forwards the respective buffer contents to transmitter 139. Transmitter 139, upon receipt of mux buffer contents, transmits the output buffer contents and/or (optionally, according to user selection) routes the mux buffer contents to stream router 150. Stream router 150, upon receipt of data from transmitter 139, routes the received data to decoder 125, I/O interfaces 103 and/or storage device 116.

The multiplexed data stream transmitted by system 100, can be received and re-transmitted by one or more re-broadcast stations (as exemplified by re-broadcast station 291) or received directly by a consumer receiver (as exemplified by receivers 293 and 295). Each of the component data streams included in the multiplexed data stream is received as a data source for a separate "television channel" in accordance with MPEG-2 specifications. A spliced data stream pair (for example, an ongoing television program spliced with a commercial) is also received, essentially transparently spliced, as a single MPEG-2 encoded channel.

Currently, system 100 requires an average bandwidth of approximately 5 MHz for splicing each data stream pair. Thus, a conventional PC having a two hundred MHz pentium (trademark of Intel Corporation) processor, for example, can support up to forty data streams simultaneously. Increased throughput is, however, likely in light of ongoing improvements in processor, backplane, memory, storage devices and system software, as well as likely further system 100 optimization. System 100 can further be synchronized to other systems for processing an increased number of data streams by providing an appropriate synchronization source.

The specific receiver hardware/software configuration and functionality may vary considerably, particularly with regard to conditions not covered by the MPEG-2 specifications. Each receiver, however, includes a complete hardware and/or software system for decoding. Since the transmission is received as a multiplexed data stream, each receiver includes a demultiplexer (not shown). Since each data stream further includes multiplexed video and audio data, each receiver further includes component data stream audio-video de-multiplexing capability (not shown) for each of a supported number of data streams channels. Each receiver also includes (for each channel) decoders for decoding MPEG-2 encoded audio and video data. Video decoder 293a and audio decoder 293b, for example, illustrate such a requisite decoder pair for a single MPEG-2 encoded data stream. (The size of each buffer, or alternatively stated, the amount of data that each buffer can contain, can vary from one receiver to another.) Each decoder includes an input buffer (not shown) for receiving the respective de-multiplexed video or audio data prior to decoding, and a corresponding frame buffer, for receiving the decoded video or audio data and reconstructing an audio-video presentation (i.e. re-construction for output to a display and other devices).

Figure 3:
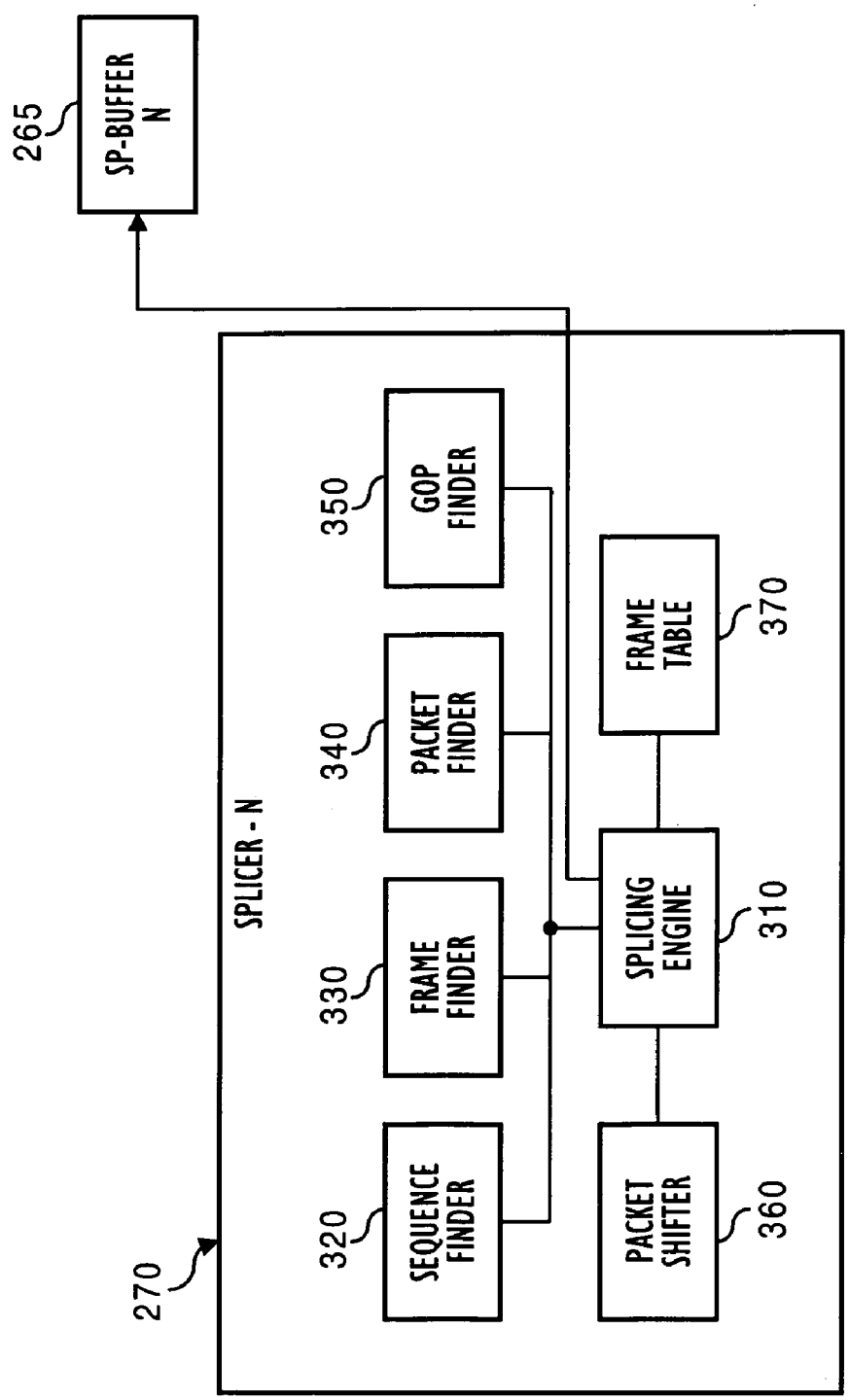
FIG. 3 is a functional block diagram illustrating a preferred splicer according to the invention.
Figure 4:
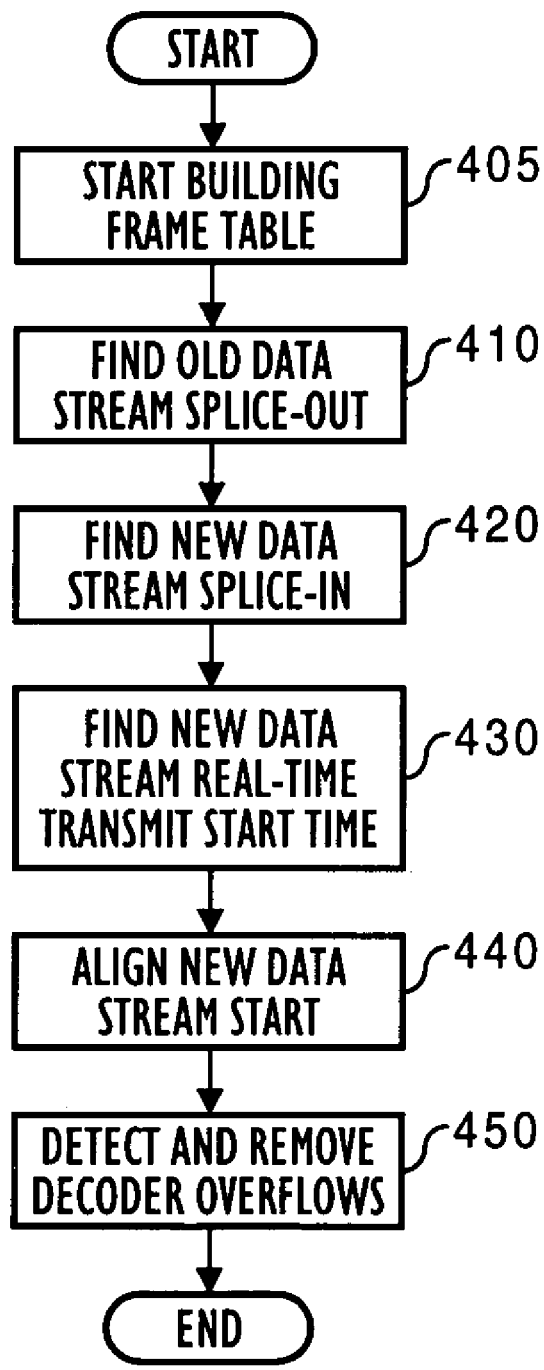
FIG. 4 is a flowchart illustrating a preferred method for splicing together a first digitally encoded stream and a second digitally encoded stream according to the invention.

FIGS. 3 and 4, with reference to FIG. 2, generally illustrate a preferred splicer and splicing method according to the invention. For clarity sake, the following discussion assumes that only two data streams (an old data stream and a new data stream) are presented to system 100 for processing and that such processing includes splicing of the two data streams. Only one splicer, splicer-N 270 (FIG. 2), and only one output buffer, splice buffer-N 265, will therefore be discussed. Those skilled in the art, in view of the discussion herein, will appreciate that additional output buffer and splicer combinations will preferably operate in a similar manner.

As shown in the FIG. 3 block diagram, splicer-N 270 preferably comprises coupled elements including splice engine 310, sequence finder 320, frame finder 330, packet finder 340, GOP finder 350, packet shifter 360 and frame table 370. Broadly stated, splice engine 310 preferably creates and populates frame table 370, and initiates and utilizes operations of other splicer-N 270 elements. Sequence finder 320, frame finder 330 packet finder 340 and GOP finder 350 preferably locate and retrieve respective sequence, frame, packet and GOP data respectively from an MPEG-2 encoded data stream. Packet shifter 360 preferably resolves timing discrepencies for splicer-N 270 creation of a seamless splice, and frame table 370 is preferably utilized for determining buffer overflow conditions.

The FIG. 4 flowchart, with reference to FIGS. 2 and 3, illustrates a preferred splicing method according to the invention. As discussed earlier, splicing is preferably initiated or "started" by a call from a host application. The call from the host application, which is commensurate with the host application filling splice buffer-N 265, initiates (i.e. "activates", "calls" or "instantiates") splicer-N 270. The call further includes the location of splice buffer-N 265 within the host processing system (or, if external, the external location of the splice buffer) and indicates that the splice is to be effectuated upon the host application having filled splice buffer-N 265 a specified number of times. Stated alternatively, a buffer location parameter passed by the host application to splicer-N 270 indicates the buffer location while a further parameter passed to splicer-N 270 indicates the "splice buffer full" in which splicer-N 270 is to end the old data stream. The host application further, upon sending the last splice buffer full of the old data stream to splice buffer-N 265, will then begin filling splice buffer-N 265 with "splice buffer fulls" of the new data stream. While the size of splice buffer-N 265 and the start of splicing are preferably user-selectable, buffer-N will typically accommodate approximately 300 kilobytes of data and the start of splicing will typically occur approximately 50 milliseconds after the start of the buffer.

It will be understood by those skilled in the art, in view of the teachings herein, that the data stream source and/or the host application could be further hosted by a processing system separate from that of splicer-N 270, and/or that splicer-N 270 could be implemented as a stand-alone process or sub-process rather than a library. Complete integration within a single processing system and the use of a library are, however, preferred due to the robust data handling requirements for completing a splice in real-time. As with a library, however, multiple such processes or sub-processes will preferably be supported, thereby providing for multiple concurrent splicing operations. As will become more apparent as the discussion progresses, a single splice-buffer which is created and filled by a host application and modified as needed by a splicer is similarly utilized for reasons of robust operation. For example, avoiding management of multiple buffers (e.g. multiple location pointers and non-contiguous data locations) and buffer copying (e.g. from multiple splicer-input buffers to separate splicer-output buffers) aids in minimizing processing system throughput requirements for performing splicing.

As shown, in step 405, splicer-N 270 creates and begins to populate frame table 370, (FIG. 3). In step 410, splicer-N 270 finds a data location in the old data stream at which transmission of the old data stream will cease prior to the spice, referred to hereinafter as an "old data stream splice-out point" or simply, "splice out-point." In step 420, splicer-N 270 finds a data location in the new data stream at which transmission of the new data stream will begin, referred to hereinafter as the "new data stream splice-in point" or simply, "splice-in point." In step 430, splicer-N 270 determines the time at which transmission of the new data stream should begin, referred to hereinafter as the "real-time transmit start point". In step 440, splicer-N 270 aligns the new data stream such that the new data stream will preferably be received by a receiver decoder concurrently with the start of decoding of the last old stream buffer, and in step 450, splicer-N 270 detects and corrects decoder buffer overflow conditions.

After completion of splicing, splicer-N 270 preferably returns parameters to the calling application (e.g. the buffer generator sub-process of the calling application). The calling application can then further manipulate splice buffer-N 265 contents, and then sets a data-ready flag, as already discussed. Thereafter, splicer-N 270 can set a PCR discontinuity packet.

As will become apparent through the discussion that follows, splicer-N 270 uses frame table 370 throughout splicing to detect and remove potential decoder input buffer overflow condition occurrences prior to transmission, such that an overflow condition will not occur after transmission. Splicer 270 also contemporaneously performs steps 410 through 450 as buffer generator 160 (FIG. 2) continues to fill splice buffer 265 with further buffer-fulls of corresponding data from an old data stream and then a new data stream. For example, splicer-N 270 finds the old data stream splice-out point while splice buffer-N 265 contains a last portion of the old data stream. Splicer-N 270 further finds a new data stream splice-in point when splice buffer-N 265 contains a first portion of the new data stream, and so on. For clarity sake, creating and populating frame table 370 will be reserved for a corresponding discussion relating to detecting and removing decoder input buffer overflow (step 450). Also for clarity sake, preferred video splicing will be considered first, merely noting when audio splicing occurs. Preferred audio splicing will then be described separately.

Figure 5:
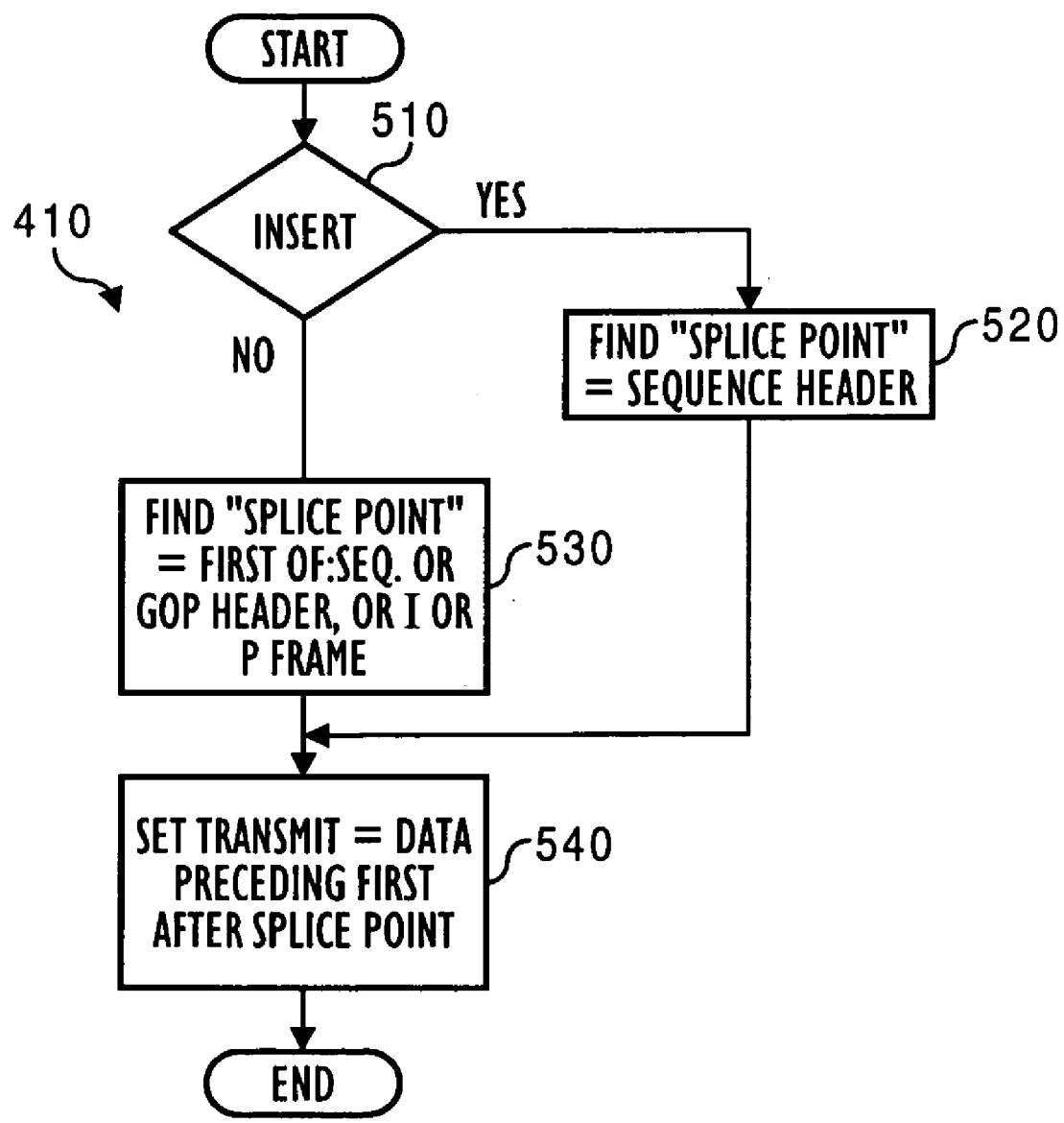
FIG. 5 is a flowchart illustrating a preferred method for finding a splice-out point in a first data stream in accordance with the preferred method of FIG. 4, according to the invention.

FIG. 5 illustrates how a preferred splicer-N 270, upon receipt of a last splice-buffer full of the old data stream, preferably finds an old data stream video splice-out point. As shown, splicer-N 270 preferably provides multiple operating modes, each of which can each be specified by a calling application. In an "insertion" operating mode, splicer-N 270 performs a splice in a manner that anticipates a later splice back to the old data stream, for example, when a commercial message is to be inserted into ongoing programming (e.g. a movie). Since the movie will continue playing following the commercial message, a preferable point to discontinue movie data stream transmission will be one which also facilitates later resuming movie transmission immediately following the point of discontinuance, or the "splice-out point." Contrastingly, in a "splice-only mode", splicer-N 270 performs an isolated splice without concern for a later continuation of the old data stream. Such a splice-only mode will typically be selected in situations such as at the conclusion of a separately encoded, pre-recorded movie, or during a live broadcast. Further, unlike a continuing movie, a user might select a last splice buffer full of a live broadcast as including "extra" frames of video data, such that finding an early splice point (i.e. before the extra frames) is particularly desireable.

As shown, if insertion mode has been selected in step 510, then splicer-N 270 finds an old data stream splice-out point as just prior to the start of a sequence header in step 520. If instead, in step 510, a splice-only mode has been selected, then in step 530, splicer-N 270 finds and old data stream splice-out point as just prior to the first occurrence of the sequence header, a GOP header, an I-frame or a P-frame. Next, in step 540, splicer-N 270 sets the bytes within splice buffer-N 265 for transmission as those bytes that precede the splice point. As will be discussed further, splicer-N 270 next uses the old data stream video splice-out point to find an old data stream audio splice-out point (not shown).

Operationally, splicer-N 270 preferably finds a sequence header, gop header, I-frame or P-frame by parsing through the data contained in splice buffer-N 265 (starting with the first received data) using a respective one of data-type finders including sequence finder 320, GOP finder 350 or frame finder 330. Each data-type finder includes a state machine for locating respective data type in accordance with the MPEG-2 specifications, as will be discussed in more detail. Splicer-N 270 further sets the bytes for transmission by counting the number of data bytes included within splice buffer-N 265 prior to the splice point (during the search), and further by returning this number of data bytes to the host application as the number of data bytes within splice buffer-N 265 that the host application should send to mux. The host application, upon receipt of this information, will typically ignore the remaining bytes (after the splice point) in splice-buffer 265.

Figure 6:
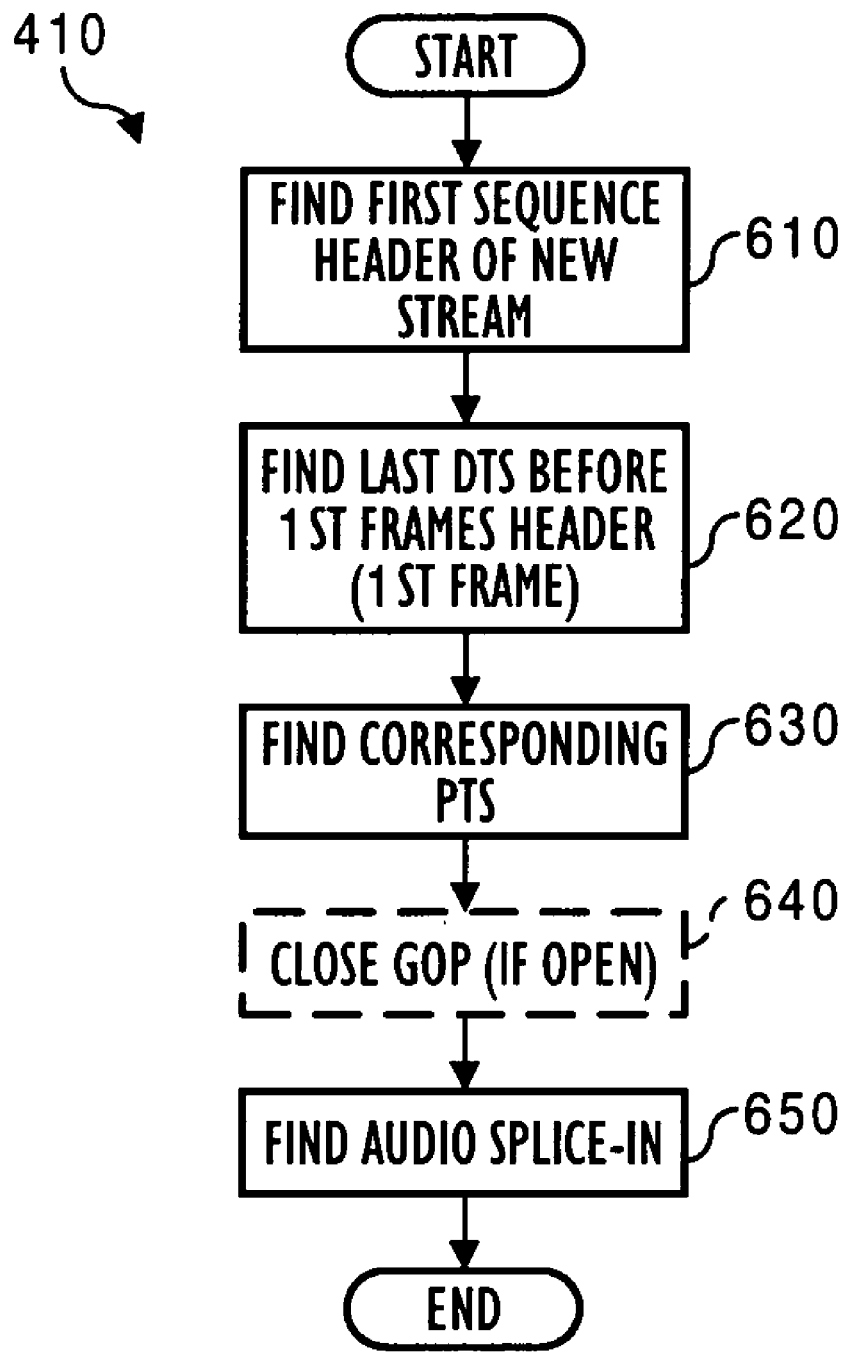
FIG. 6 is a flowchart illustrating a preferred method for finding a splice-in point in a second data stream in accordance with the preferred method of FIG. 4, according to the invention.
Figure 7:
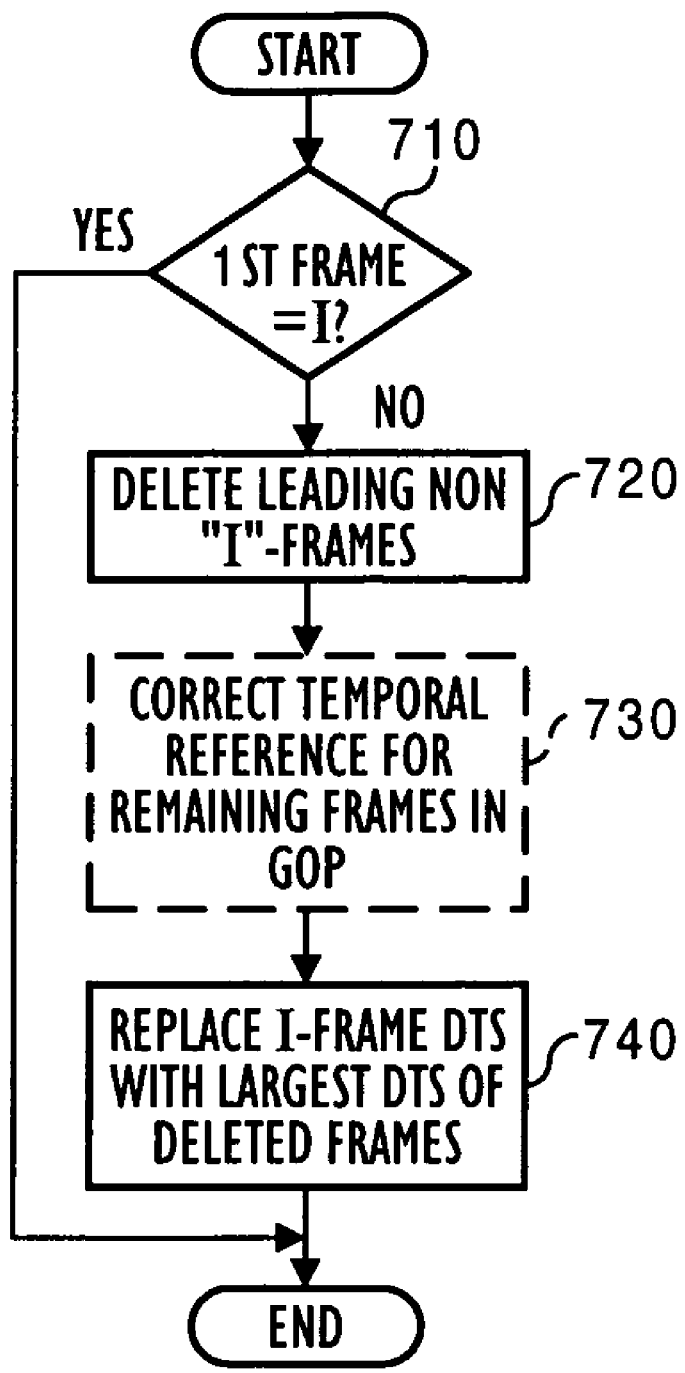
FIG. 7 is a flowchart illustrating a preferred method for closing a leading open-group of pictures in a second data stream in accordance with the preferred method of FIG. 4, according to the invention.
Figure 8:
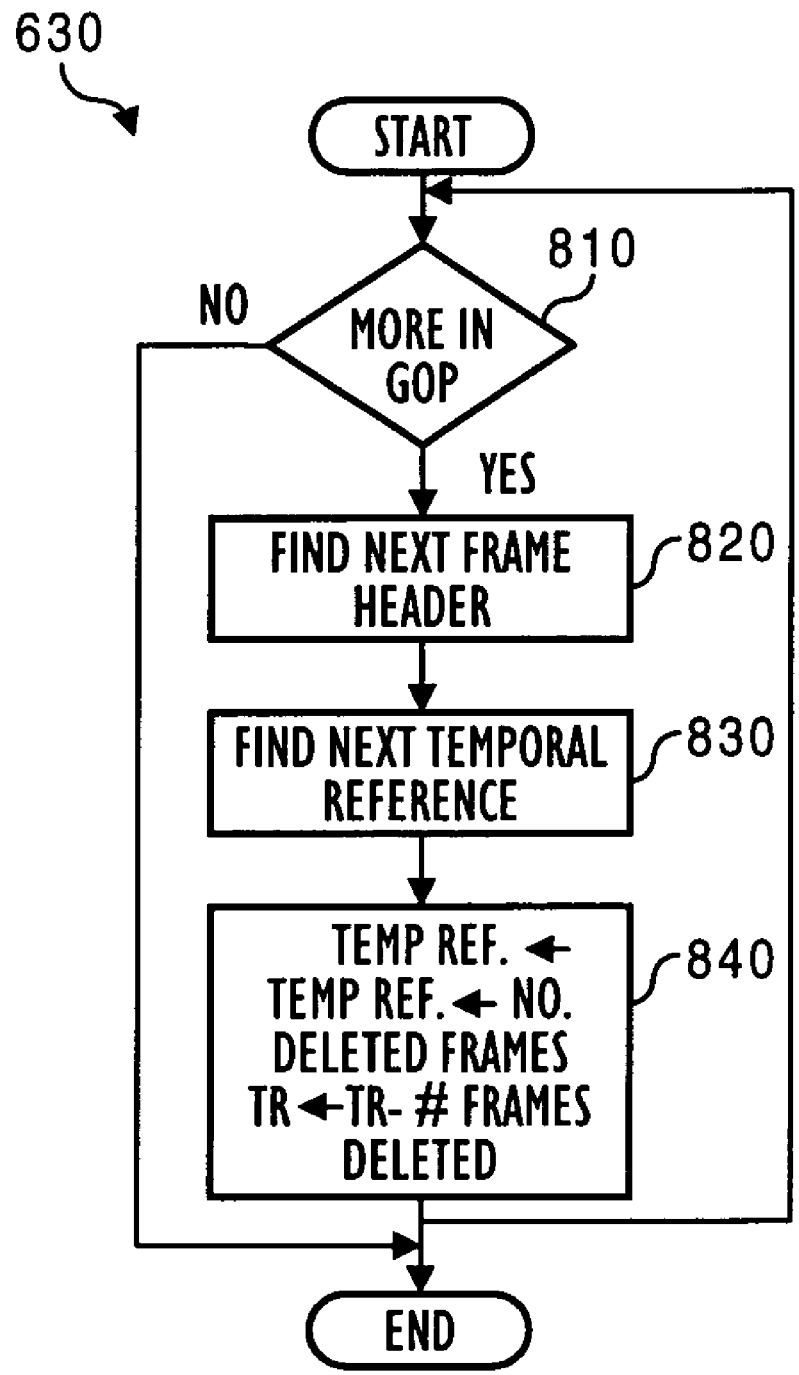
FIG. 8 is a flowchart illustrating a preferred method for resolving temporal references when closing a group of pictures in accordance with the preferred method of FIG. 7.

FIGS. 6 through 8, with reference to FIG. 3, illustrate how a preferred splicer finds a video splice-in point in the new data stream. As discussed, the host application will indicate (when calling splicer-N 270) the splice buffer full that will contain the end portion of the old data stream. The following splice buffer full will therefore contain a first portion of new data stream data. Broadly stated, splicer-N 270 will again parse through the data stream data contained in splice buffer-N 265 to determine a new data stream splice point. Details of splicer-N 270 operation will be more easily understood first by reference to certain aspects of the MPEG-2 specifications.

The MPEG-2 specifications provide for encoding of a continuous video stream as a series of sequences. Each sequence is further divided into groups of pictures ("GOPs") and each GOP contains a series of encoded video frames. Each sequence includes a sequence header, each GOP includes a GOP header and each frame includes a frame header. As will be discussed further, each sequence also includes at least 10 program clock references or "PCRs". In addition, each data stream is transmitted as a contiguous, but not necessarily continuous series of packets, with each packet having a packet header. Each MPEG-2 encoded video frame further includes, in addition to video data and a frame type field (i.e. an I, B or P frame), timing and relative ordering information. The frame timing information includes (for each frame) a decode time stamp or "DTS" field, (which indicates the time at which a received frame will be decoded), and a corresponding presentation time stamp or "PTS" field (which indicates the time at which the decoded frame will be presented for display). The frame relative ordering information includes (for each frame) a temporal reference field (indicating the order in which the frame is to be displayed as compared with other frames in the same GOP).

Despite the large amount of identifying information contained within a data stream however, MPEG-2 encoding provides information only with respect to a single encoded data stream and often in a manner that is not easily accessible. For example, the MPEG-2 specifications provide for variable ordering of the above information and distribution of such information among GOPs and even packets. More particularly, while within a data stream, a first sequence header must be followed by a GOP header (for a first GOP) and then a frame header (for the first frame contained in the GOP), the DTS and PTS pair for the first frame might be located essentially anywhere before the frame header. As will become apparent, this DTS and PTS pair are preferably used by splicer-N 270 for both finding a splice-point and for aiding in real-time alignment of the new data stream with the old data stream.

Returning now to FIG. 6, splicer-N 270 preferably performs a splice by first finding the DTS and PTS for the first video frame of the new data stream. Splicer-N 270 finds this DTS and PTS pair first by finding the first sequence header of the new stream in step 610, then finding and storing the last DTS before the first frame header (which will be the frame header for the first video frame) in step 620, and then finding and storing the PTS corresponding to the DTS in step 630. Next, in step 640, splicer-N 270 assures that the first presented frame of the new stream will be an I-frame. More specifically, if the first GOP of the new data stream is open, then splicer-N 270 "closes the GOP". Finally, in step 650, splicer-N 270 finds an audio splice-in point. (For clarity sake, audio splice-in and splice-out will be discussed following a completed discussion relating to video.) Operationally, splicer-N 270 preferably finds the sequence header (i.e. step 610) by initiating sequence finder 320 (FIG. 3). Sequence finder 320 is preferably a state machine which parses the new data stream data contained in splice buffer-N 265 for a first occurrence of a sequence header code. Each sequence header code is defined by the MPEG-2 specifications as the numeric series "000001B3 Hex." Splicing engine then similarly parses the new data stream data for a preceding DTS and PTS (i.e. the DTS and PTS for the first frame of the new data stream). Those skilled in the art will understand, in view of the teachings of the present invention, that the splice-in point can alternatively be selected as other than the first frame of the new data stream. Such an alternative frame might be required, for example, where it is desirable for only a later portion of a complete commercial message to be played. In such an instance, a user may specify either a desirable "gross start time" (from which splicer-N 270 will further determine a splice-in point), or a user might specify a splice-in point directly.

FIGS. 7 and 8 illustrate how splicer-N 270 preferably closes an open first GOP of a new data stream (step 540 of FIG. 6).

Encoding specifications, and particularly MPEG-2, typically do not require that each GOP must begin with a frame that itself contains sufficient data to re-create a video image or frame (i.e. an I-frame). A GOP having a first frame that requires a frame from a preceding GOP to re-create a video image is commonly referred to as an "open" GOP. An open GOP might occur, for example, where a new data stream has been edited and stored prior to splicing ("broken link"). While, assuming proper encoding, an open GOP will always be preceded by a GOP containing a corresponding I-frame and dependent frames of the open GOP can therefore be re-created, no such I-frame exists with respect to the first GOP of a new data stream. Therefore, splicer-N 270 assures that the first presented frame of a new data stream is an I-frame.

One method utilized by splicer-N 270 for "closing" an open GOP includes decoding the frames upon which the first frame of the open GOP depends and the first frame itself. Next, the first frame is re-encoded as an I-frame. Unfortunately, such a method is expensive with regard to adding dedicated hardware and/or in terms of requisite throughput in a real-time, processor-based system. This alternative method for closing a GOP is therefore provided only as an option to accommodate applications where absolute accuracy is desired.

It is discovered, however, that an open GOP can alternatively be closed by deleting, rather than re-constructing, the leading dependent frames (i.e. B frames) with only minimal further modification to the remaining frames in the previously open GOP. While the images represented by the deleted video frames are lost and the length of the new data stream is affected, the loss of typically 66 milliseconds is found to be acceptable in light of the minimal processing time required to close the GOP. (All GOPs other than a leading open GOP of a new data stream remain unmodified according to this preferred method, as illustrated in FIGS. 6 and 7.) Returning now to FIG. 7, if, in step 610, the first GOP of the new data stream is an open GOP (i.e. the first frame of the GOP is other than an I-frame), then, first in step 720, splicer-N 270 deletes all leading non-I-frames. Next, in step 730, splicer-N 270 corrects the temporal references for each of the remaining frames in the GOP. Finally, in step 740, splicer-N 270 replaces the DTS of the first I-frame of the GOP with the largest DTS of the frames deleted in step 620.

The FIG. 8 flowchart further illustrates how the temporal references are preferably replaced according to the invention. As shown, if, in step 810 more frames remain in the GOP after the last deleted frame, then, in step is 820, splicer-N 270 first finds the next frame header in the GOP (indicating the now "current" frame). Next, in step 830, splicer-N 270 finds the corresponding temporal reference for the current frame. Finally, in step 840, splicer-N 270 replaces the temporal reference with the temporal reference minus the number of deleted frames, and then returns to step 710.

Operationally, splicer-N 270 (FIG. 3) preferably finds a next frame by initiating frame finder 330. Frame finder 330 is preferably a state machine which parses the new data stream data contained in splice buffer-N 265 for a next occurrence of a frame header. Each frame header is defined by the MPEG-2 specifications as the numeric series "00000100 Hex."

By way of example following open GOP will now be closed in accordance with a preferred method illustrated by FIGS. 7 and 8.

| Temporal ref: | 2 | 0 | 1 | 5 | 3 | 4 |
| --- | --- | --- | --- | --- | --- | --- |
| Frame type: | I | B | B | P | B | B |
| DTS: | −1 | 0 | 1 | 2 | 3 | 4 |

First, the two leading B-frames (i.e. temporal reference numbers 0 and 1) are deleted, leaving the I frame and the two B-frames that follow the I frame in the GOP.

| Temporal ref: | 2 | 5 | 3 | 4 |
| --- | --- | --- | --- | --- |
| Frame type: | I | P | B | B |
| DTS: | −1 | 2 | 3 | 4 |

Next, the temporal references for the remaining frames are replaced sequentially, beginning with the temporal reference for the first deleted frame.

| Temporal ref: | 0 | 3 | 1 | 2 |
| --- | --- | --- | --- | --- |
| Frame type: | I | P | B | B |
| DTS: | −3 | 0 | 1 | 2 |

Finally, the DTS of the leading I-frame is replaced by the highest DTS of the deleted frames.

| Temporal ref: | 0 | 3 | 1 | 2 |
|---|---|---|---|---|
| Frame type: | I | P | B | B |
| DTS: | −1 | 0 | 1 | 2 |

Figure 9A:
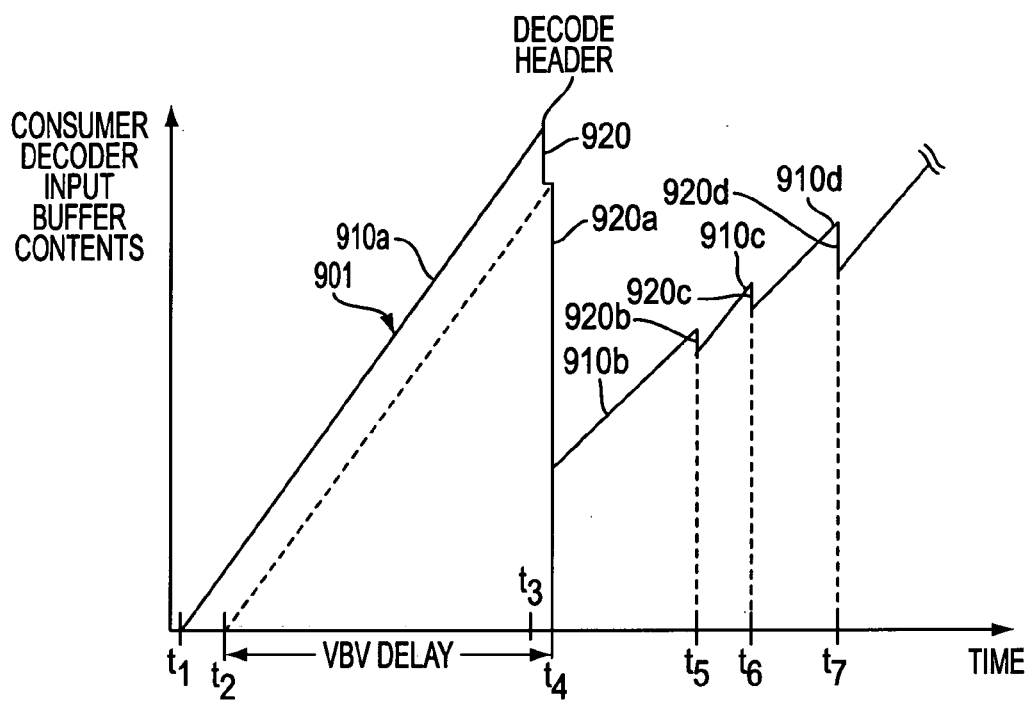
FIG. 9a is a graph illustrating how an MPEG-2 encoded data stream is conventionally received by a decoder input buffer and then decoded.
Figure 9B:
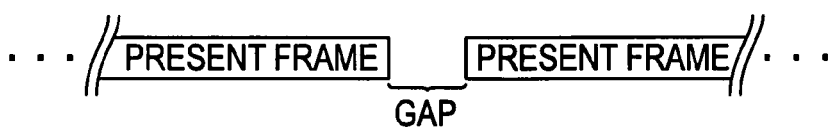
FIG. 9b illustrates a conventional display scan rate timing relationship between two video frames for displaying the video frames in succession; accordance with the preferred method of FIG. 4, according to the invention.
Figure 10:
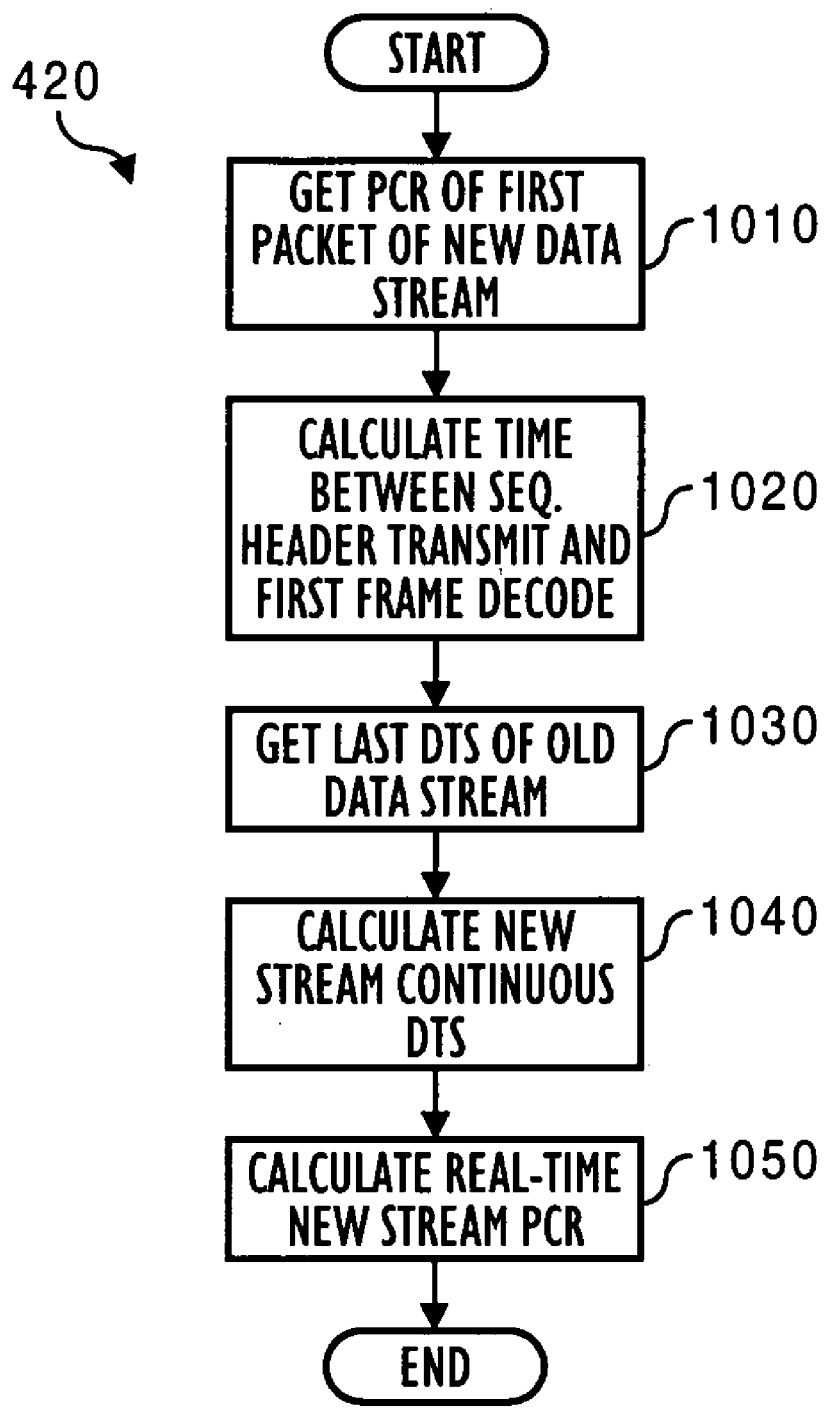
FIG. 10 is a flowchart illustrating a preferred method for determining a real-time new data stream PCR, in accordance with the preferred method of FIG. 4, according to the invention.

FIGS. 9a through 10 illustrate how, after finding a splice-in point, a preferred splicer according to the invention preferably finds a new stream real-time transmit start time for the new data stream (i.e. step 420 of FIG. 4). A brief further review of certain observed MPEG-2 specification dynamics should aid in a better understanding of how a seamless splice is provided according to a preferred embodiment of the invention.

The FIG. 9a graph illustrates how a new MPEG-2 encoded data stream is received and decoded by, for example, a consumer receiver under circumstances envisioned by the MPEG-2 specifications (e.g. in the absence of splicing). The graph depicts an amount of data received by a decoder input buffer as an increasing vertical position against time, which increases from left to right along the horizontal axis. During time periods indicated by sloped curve segments 910 through 910d, data is received by the decoder input buffer, while decoding occurs at times indicated by vertical curve segments 920 through 920d.

As shown, a delay occurs between the initial receipt of the new data stream at t1 and decoding of a of a first frame (according to the frame's DTS) at time t4. While the delay between receipt of a first frame at time t2 and decoding of a first frame (according to the frame's DTS) is given by a data field within the first (and each successive frame), it should be noted that the actual time between receipt of the data stream and decoding of the first frame also includes receipt and decoding of the initial sequence header at times t1 to t2 and t3 to t4 respectively.

FIG. 9b further illustrates that, in order to display motion video without producing a video artifact commonly referred to as rollover, a constant known delay must occur between the start of display for a first frame and the start of display for a next frame that is equal to the scan time for one video frame. With NTSC encoding, for example, the inter-frame delay is approximately 33 msec. It is therefore observed that a seamless splice can be achieved by providing a reliable timing reference that takes into account transmission-to-decoding delay (and thus, receipt-to-decoding delay), and that assures display of a new stream commensurate with the inter-frame display delay.

The FIG. 10 flowchart illustrates how a preferred splicer preferably determines a new data stream real-time transmit start time (step 420 of FIG. 4). Broadly stated, steps 1010 and 1020 produce values relating to only the new stream, while steps 1030 through 1050 use these values to establish a new data stream transmission time corresponding to the old data stream. More specifically, in step 1010, splicer-N 270 retrieves the PCR ("PCR (new)") for the first packet of the new data stream. In step 1020, splicer-N 270 calculates the time difference ("delta(new)") between transmission time for the first sequence header of the new data stream and the decoding time stamp ("DTS (new)") of the first frame of the new stream (which was stored earlier), as given by the equation delta(new)=$DTS$(new)−PCR In step 1030, splicer-N 270 parses the old data stream data contained in splice buffer-N 265 for the decode time stamp ("DTS (old)") of the last frame of the old data stream. In step 1040, splicer-N 270 calculates a continuous-display decoding time stamp ("DTS (continuous)") for the new data stream as the addition of the DTS(old) found in step 1030 and the inter-frame delay (which is also referred to as "gap" in the discussion that follows).

$DTS$(continuous)=$DTS$(old)+inter-frame delay

For NTSC, this equation becomes $DTS$(continuous)=$DTS$(old)+1001/30,000 sec.

Finally, in step 1050, splicer-N 270 calculates a real-time new stream PCR ("PCR (new-RT)"), as the difference between the continuous-display DTS determined in step 1040 and the transmission delay or delta found in step 1020.

$PCR$(new-$RT$)=$DTS$(continuous)−delta(new).

Figure 11:
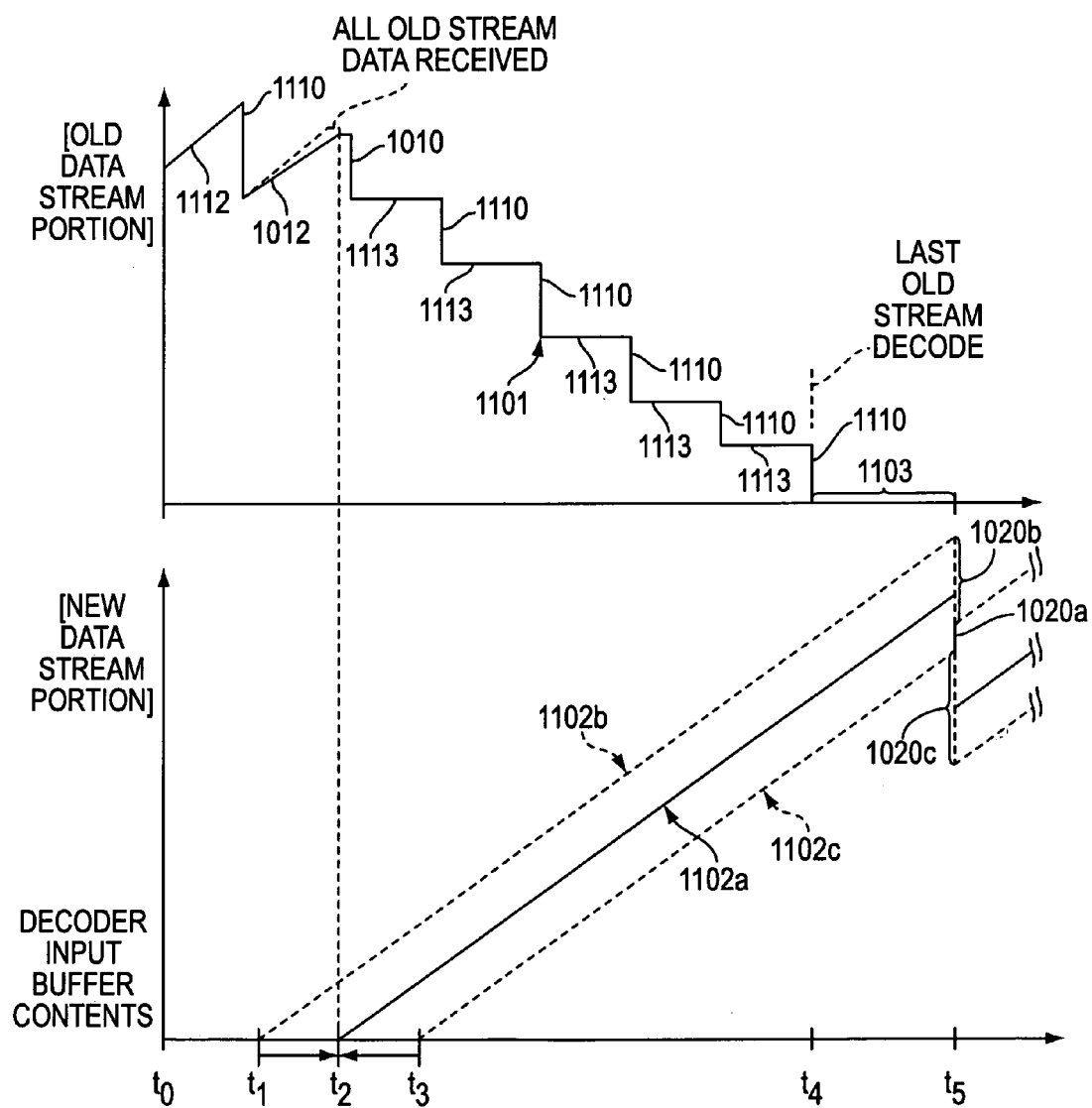
FIG. 11 is a graph illustrating how a second data stream would be received by a decoder input buffer in relation to a first data stream after determining a real-time new data stream PCR, in accordance with the preferred method of FIG. 4, according to the invention.

The FIG. 11 graph illustrates, by way of exemplary decoder input buffer contents, the results achieved by the preferred method for determining a new data stream real-time transmit start time as illustrated in FIG. 10. For clarity sake, the old data stream 101 and potential new data stream variations 1102a through 1102c are illustrated separately in the upper and lower portions of the graph respectively. As depicted, each of the upper and lower graph portions indicate the passage of time on the horizontal axis as increasing from left to right and increasing input buffer contents as increasing vertical positions (as in the FIG. 8a unmodified, single MPEG-2 encoded data stream graph). Further, decoding according to DTS values is given by vertical curve portions 1110 and 1120a–c for old data stream 1101 and the potential new data stream variations 1102a through 1102c respectively, while receipt of data stream data between decoding is given, for example, by curve portions 1112 and 1113 for old data stream 1101. It should be noted however, that according to a preferred splicer, the illustrated portions of the new data stream and the old data stream will not yet have been transmitted or received by a decoder input buffer. Rather, the graphed data is provided for illustrative purposes only.

As shown, determining the real-time new stream PCR in relation to the last DTS value of the old stream (plus an inter-frame delay or gap) and the first DTS of a new stream, serves first to align this data stream pair. Stated alternatively, the real-time new stream PCR will cause the first frame of the new stream to be decoded (for NTSC) approximately 33 msec (1001/30 msec) after decoding the last frame of old stream 1103. Similarly, the first PTS of the new stream will also be determined in accordance with the real-time new stream PCR. Thus, for NTSC encoding, presentation and display of the new data stream will begin approximately 33 msec after the last frame of the old stream is displayed. Therefore, the new data stream will be seamlessly decoded and presented for display without causing such visual artifacts as rollover.

Splicer-N 270 determines inter-frame gap 1103 by launching sequence finder 320 (FIG. 3) to find the first sequence header of the new data stream. Splicing engine 310 then finds the frame rate value contained within the sequence header, in accordance with the MPEG-2 specifications, and calculates gap 1103 as 1/(frame rate given by the frame rate code).

The frame rate codes according to the MPEG-2 specifications are given by the following frame rate code to frame rate value conversion table.

| Frame rate code | Frame rate value |
| --- | --- |
| 0000 | forbidden |
| 0001 | 24000 + 1001 (23,976) |
| 0010 | 24 |
| 0011 | 25 |
| 0100 | 30000/1001 (29.97) |
| 0101 | 30 |
| 0110 | 50 |
| 0111 | 60000 + 1001 (59.94) |
| 1000 | 60 |
| ... | reserved |
| 1111 | reserved |

It is should also be noted that splicer-N 270 further determines the real-time new stream PCR according to the actual or "real-time" delay between transmission and decoding of the first frame of the new data stream. Therefore, all of the new data stream data be transmitted for receipt by the decoder in accordance with the new data stream's encoding (i.e. as with the MPEG-2 envisioned separate transmission and receipt, and in the absence of splicing). Preserving the data stream portion relationships is particularly important since, as discussed, proper MPEG-2 encoding assures both proper decoding and presentation, as well as proper data flow. Stated alternatively, among other features, adherence to the MPEG-2 encoding should assure that the data stream data will not cause a decoder buffer to overflow or underflow (assuming that the data stream has been properly encoded). Therefore, by avoiding modification of data portion relationships established during encoding, the preferred splicer avoids the need to correct errors that might occur as a result of such modifications after the splice is completed. Rather, at least with respect to a preferred splicer, the new data stream will continue to be decoded and presented in accordance with its encoding following the splice.

Unfortunately however, FIG. 11 also illustrates that the presence of the new data stream data in the decoder input buffer prior to complete decoding of the old data stream may yet be problematic. First, the start of decoder input buffer receipt of new data stream data might occur either prior to or following decoding of the last "buffer full" of the old data stream data. Secondly, the new data stream data might be so substantial as to cause the decoder input buffer to overflow. To make matters worse, such overflow might occur at various points in time prior to decoding the last frame of the old data stream.

As shown, old data stream 1101 will be received by the decoder input buffer until time t2. Then, from time t2 to time t4, all remaining old data stream data in the decoder input buffer (i.e. the "last buffer of the old data stream") will simply be decoded until all remaining old data stream data (received by the decoder) has been decoded. The first problem (i.e. misalignment of the start of the new data stream with the start of the last buffer of the old data stream) does not exist with respect to potential new data stream 1102*a*. However, it is possible that initial receipt of the new data stream will occur early, as given by potential new data stream 1102*b* (i.e. the "early data stream"), which occurs prior to time t2. Unfortunately, the presence of the early data stream data not only might lead to overflow (in conjunction with ongoing receipt of old data stream data), but parallel transmission and receipt of multiple data streams on the same channel also violates the MPEG-2 specifications. Potential new data stream 1102*c* (i.e. the "late data stream") is also problematic in that, by occurring some time after time t2 and in conjunction with old data stream 1101 decoding, underflow might occur.

Figure 12:
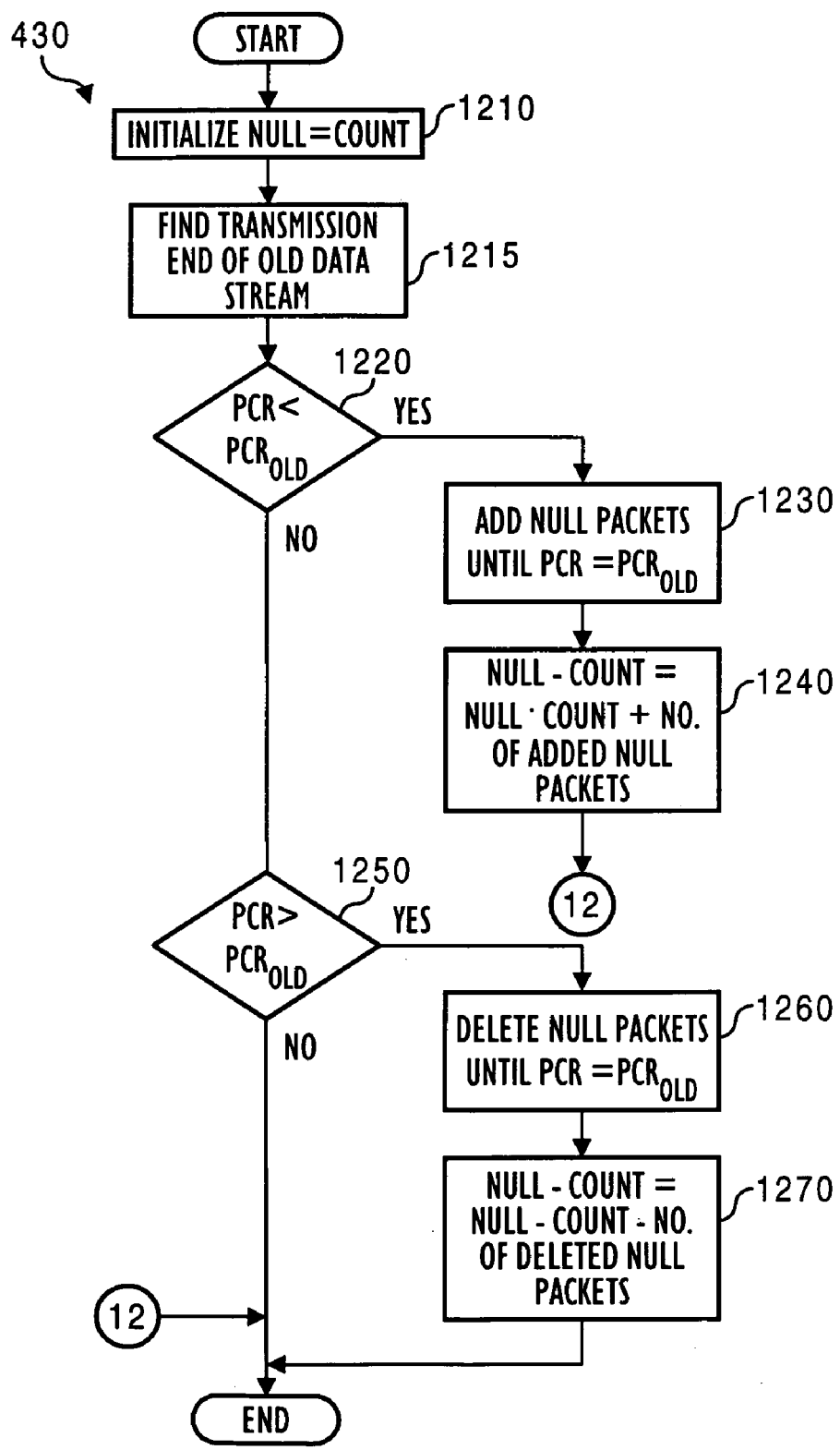
FIG. 12 is a flowchart illustrating a preferred method for aligning receipt, by a decoder input buffer, of a second data stream with decoding, by the decoder input buffer, of a first data stream, in accordance with the preferred method of FIG. 4, according to the invention.

The FIG. 12 flow chart illustrates how a preferred splicer according to the invention preferably aligns the start of decoder input buffer receipt of new data stream data with the start of the last buffer of the old data stream. Broadly stated, if the new data stream is an early data stream type (e.g. curve 1102*b* of FIG. 11), then splicer-N 270 delays transmission of (and equivalently, delays reception by a decoder of) the new data stream data. If instead, the new data stream is a late stream type (e.g. curve 1102*c* of FIG. 11), then splicer-N 270 accelerates transmission of (and equivalently, accelerates reception by a decoder of) new data stream data. More specifically, splicer-N 270 preferably delays the new data stream data by adding null packets prior to the start of new data stream transmission, or accelerates the new data stream by deleting null packets that have been encoded into the data stream. Splicer-N 270 further preferably stores a total number of added/deleted null packets for later use during splicing, as will be discussed further herein.

As shown, in step 1210, splicer-N 270 initializes a summing variable ("null-count") and, in step 1215, splicer-N 270 finds the end of transmission of the old data stream. If, in step 1220, the real-time new data stream PCR is less than the time when the last packet of the old stream is transmitted ("PCRold"), then splicer-N 270 determines a sufficient number of null packets to the start of the new data stream such that the real-time new data stream PCR equals PCRold, and then correspondingly updates null-count in step 1240. If instead, in step 1250, the new data stream is late, then splicer-N 270 deletes a sufficient number of null packets near the start of the new data stream such that the real-time new data stream PCR equals PCRold in step 1260, and then correspondingly updates null-count in step 1270.

Since, however, splicer-N 270 is preferably a library function, splicer-N 270 is not aware of the total size of splice buffer 265. Therefore, while splicer-N 270 can safely remove null packets from the data stream data stored in splice buffer-N 265 (thereby requiring a lesser splice buffer size), the data stream data plus additional null packets might exceed the size of splice buffer 265. Therefore, splicer-N 270 adds null packets by returning the value of null-count to the host application with instructions to add that many null packets prior to transmission of the data stored in splice buffer-N 265. Those skilled in the art will understand, in view of the discussion herein, that a splicer according to the invention and functioning as a complete application could specify a static or dynamic splice buffer size such that the splicer could add null packets directly to the splice buffer.

While the addition and subtraction of null packets from the new data stream is contrary to retaining the encoding characteristics of the new data stream, such modification requires a relatively small amount of processing system throughput, particularly since the requisite PCR value is already known and the requisite PCRold can be readily found by counting packets from a previous splice-in point or start of transmission. Further, while particularly deleting null packets from the new data stream will cause data to be received by an input buffer more quickly and might result in overflow, compensation for data stream modifications during alignment is made prior to the completion of splicing, as will be discussed further.

Figure 13A:
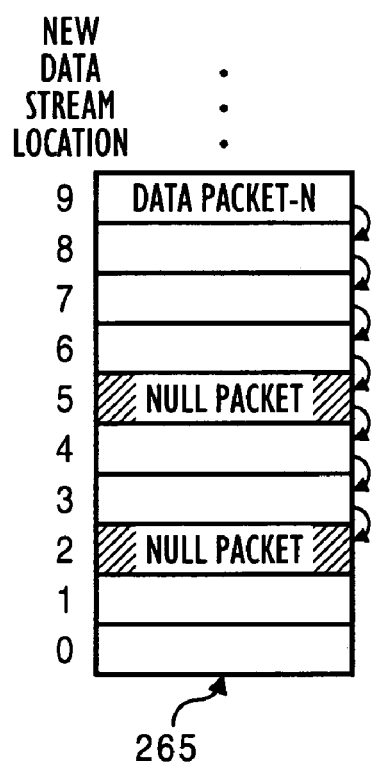
FIG. 13a illustrates a preferred method for deleting a null packet within a data stream, where the data stream is stored in a splice buffer, according to the invention.
Figure 13B:
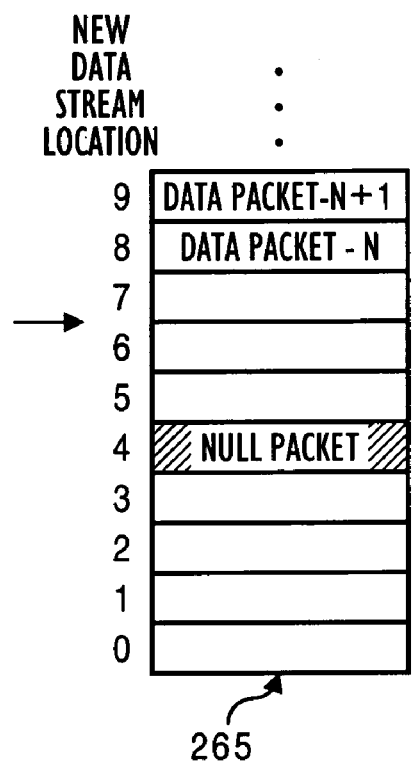
FIG. 13b illustrates a splice buffer configuration after implementing the preferred method of FIG. 12a, according to the invention.

FIGS. 13*a* and 13*b* illustrate how a preferred splicer according to the invention preferably deletes null packets from the new data stream. As shown, splice buffer-N 265 (FIG. 2) is populated with data stream data as sequentially-ordered component data packets. This arrangement allows splicer-N 270 to access, parse through and/or manipulate data stream data at the packet level without further manipulation or re-organization (i.e. as opposed to other organization alternatives, such as sequences, GOPs, frames, or other levels of granularity).

Splicer-N 270 deletes data packets by copying each remaining data packet to a next new stream location in splice buffer-N 265. By way of example, FIG. 13*a* shows a null packet contained in location 2 of splice buffer-N 265. Splicer-N 270 deletes the null packet contained in location 2 by copying each remaining packet in the new data stream to a previous (i.e. in time, or equivalently, lower numbered) location, thereby over-writing the null packet contained in location 2 and resulting in the modified splice buffer-N 265 shown in FIG. 13*b*. (Since each sequence in a data stream will typically contain at least 10 percent or more null packets, the existence of null packets that might be deleted has not been found and is not likely to become problematic.)

Those skilled in the art, in view of the disclosure herein, will appreciate that many different types of data structures might be substituted for the splice buffer-N 265. Examples include but are not limited to multi-dimensional tables and linked lists. Utilizing the above copying method for insertion and deletion is also readily replaceable by a variety of conventional list-handling methods, of which linked-lists and supported use of empty cells are examples. The preferred method, while expensive in terms of processing throughput, is preferred due to minimized complexity and expense in temporarily (i.e. during a splice) receiving data directly from an encoder and then routing data to a mux buffer, as well as in performing a splice in real-time. It is contemplated however, that other such list and list-management methods might be utilized, particularly in light of ongoing hardware and software development.

Figure 14:
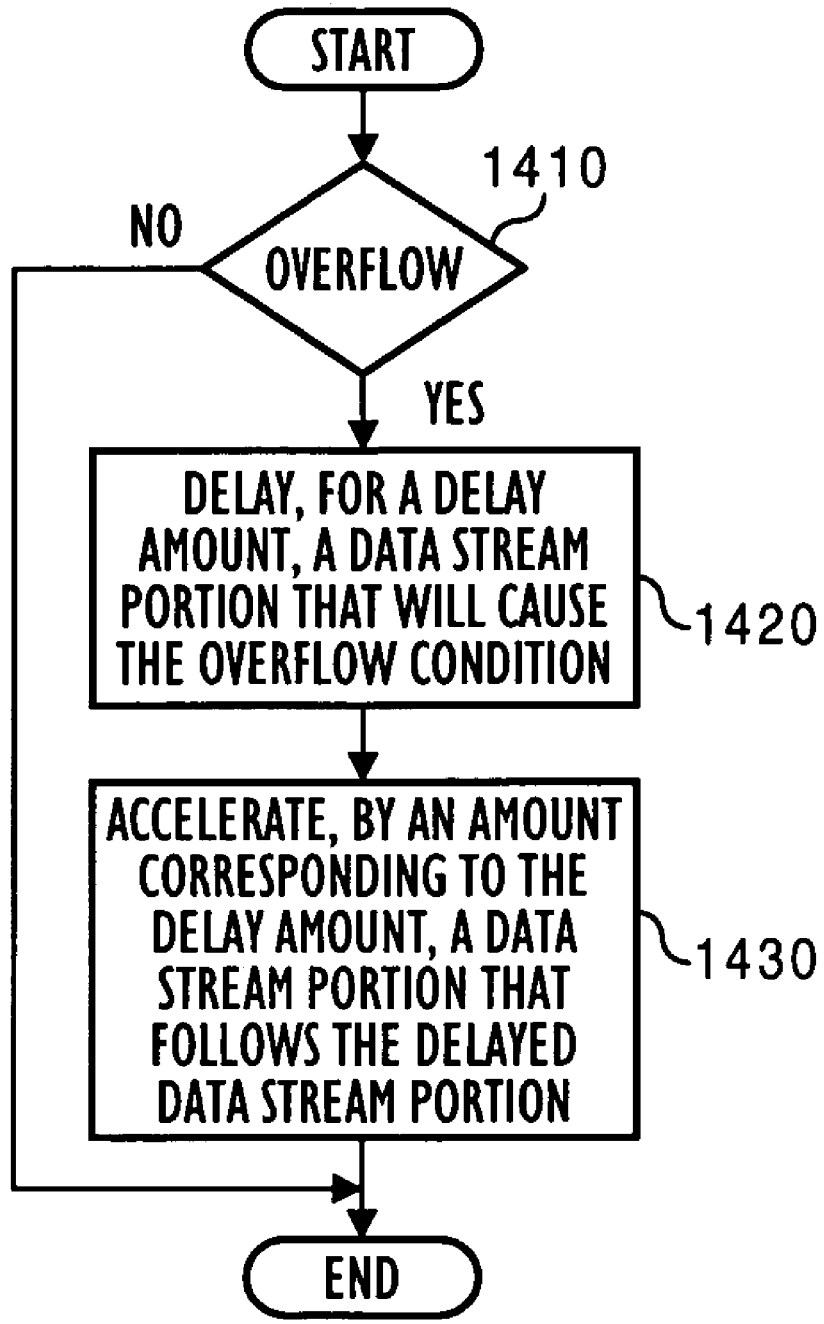
FIG. 14 is a flowchart illustrating a preferred method for removing overflow of a decoder input buffer resulting from the concurrent presence in the decoder input buffer of an old data stream and a new data stream to be spliced together, according to the invention.
Figure 15A:
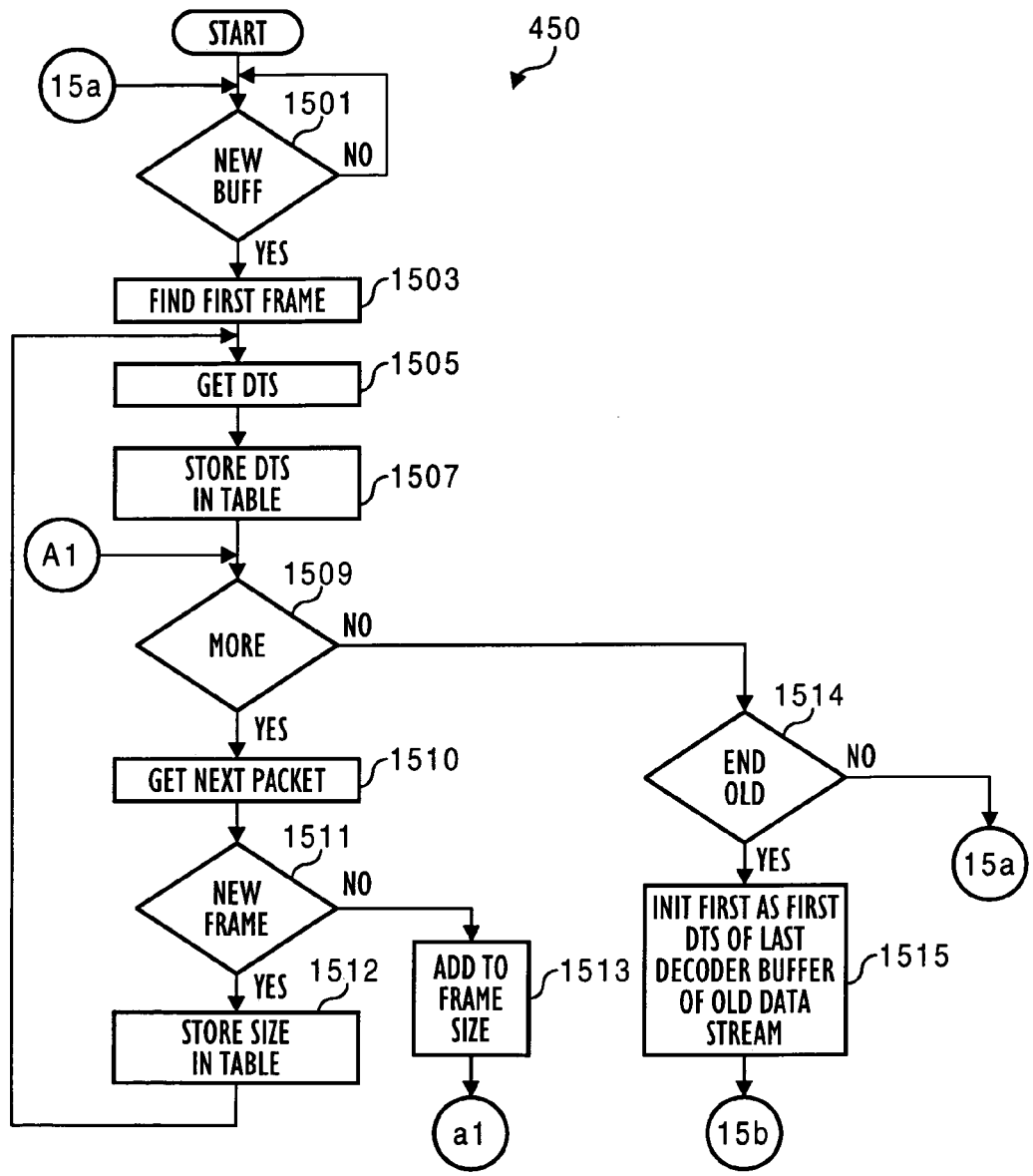
FIG. 15a is a first flowchart portion illustrating a preferred method for populating a splice table with old data stream frame data in accordance with a preferred method for detecting and removing decoder input buffer overflow, according to the invention.
Figure 15B:
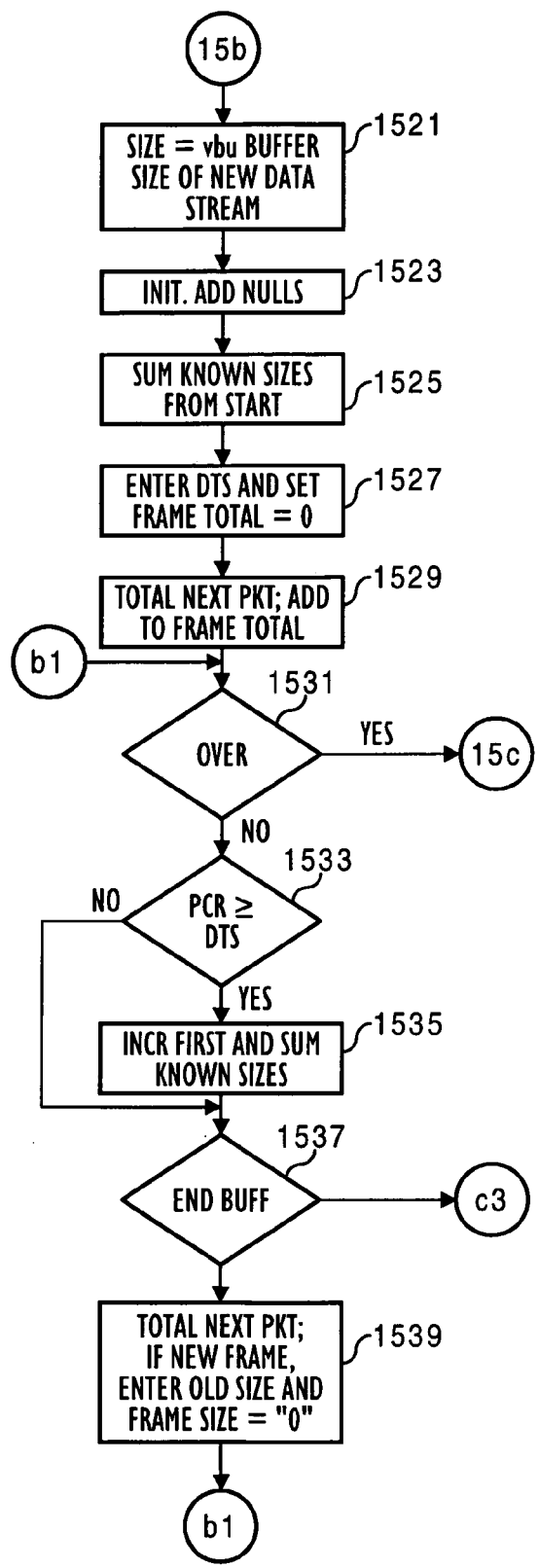
FIG. 15b is a continuation of the FIG. 15a flowchart illustrating a first portion of a preferred method for populating a splice table with new data stream data and concurrently detecting overflow, in accordance with the preferred method of FIG. 14, according to the invention.
Figure 15C:
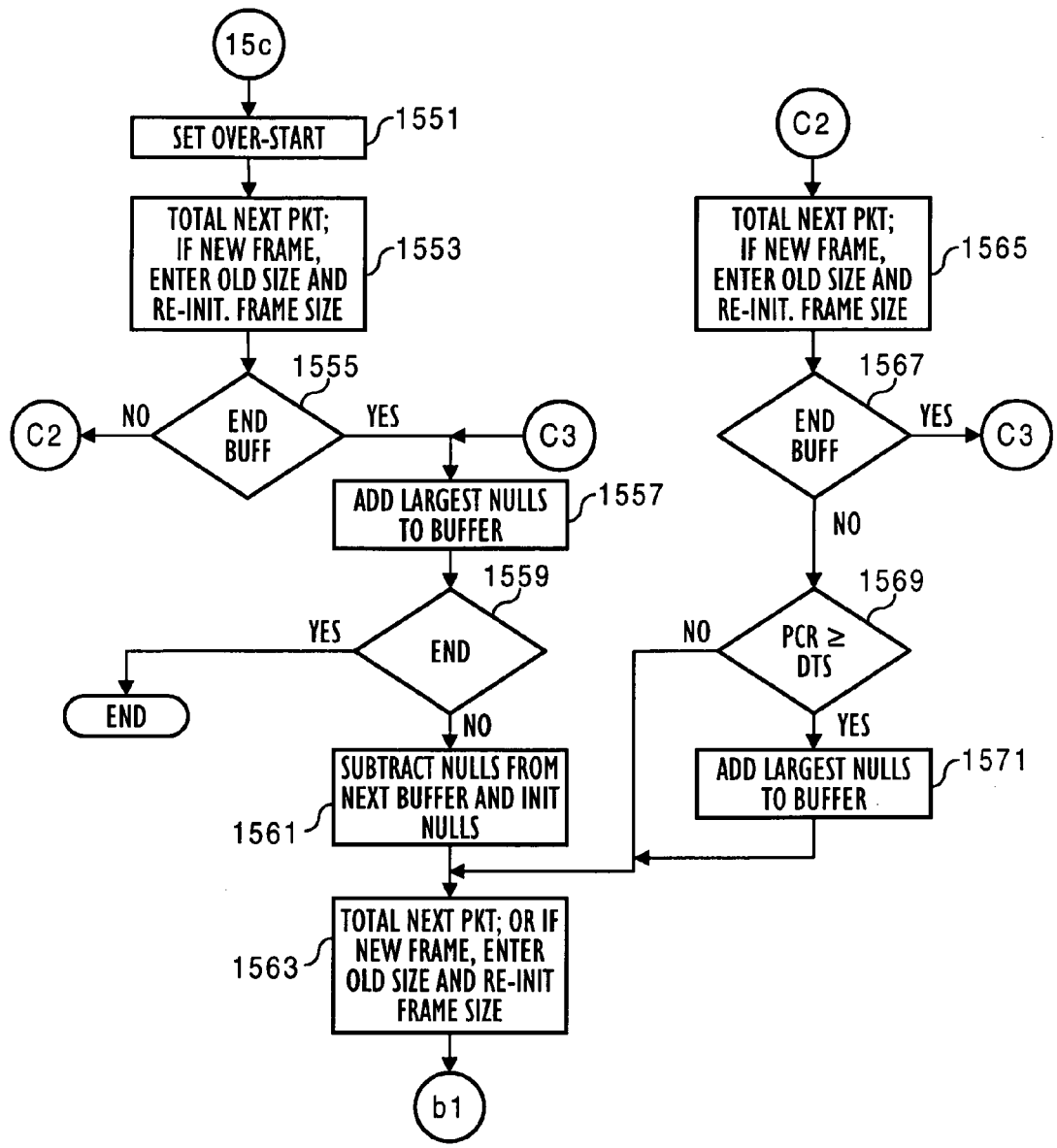
FIG. 15c is a continuation of the FIG. 15b flowchart, according to the invention.
Figure 16:
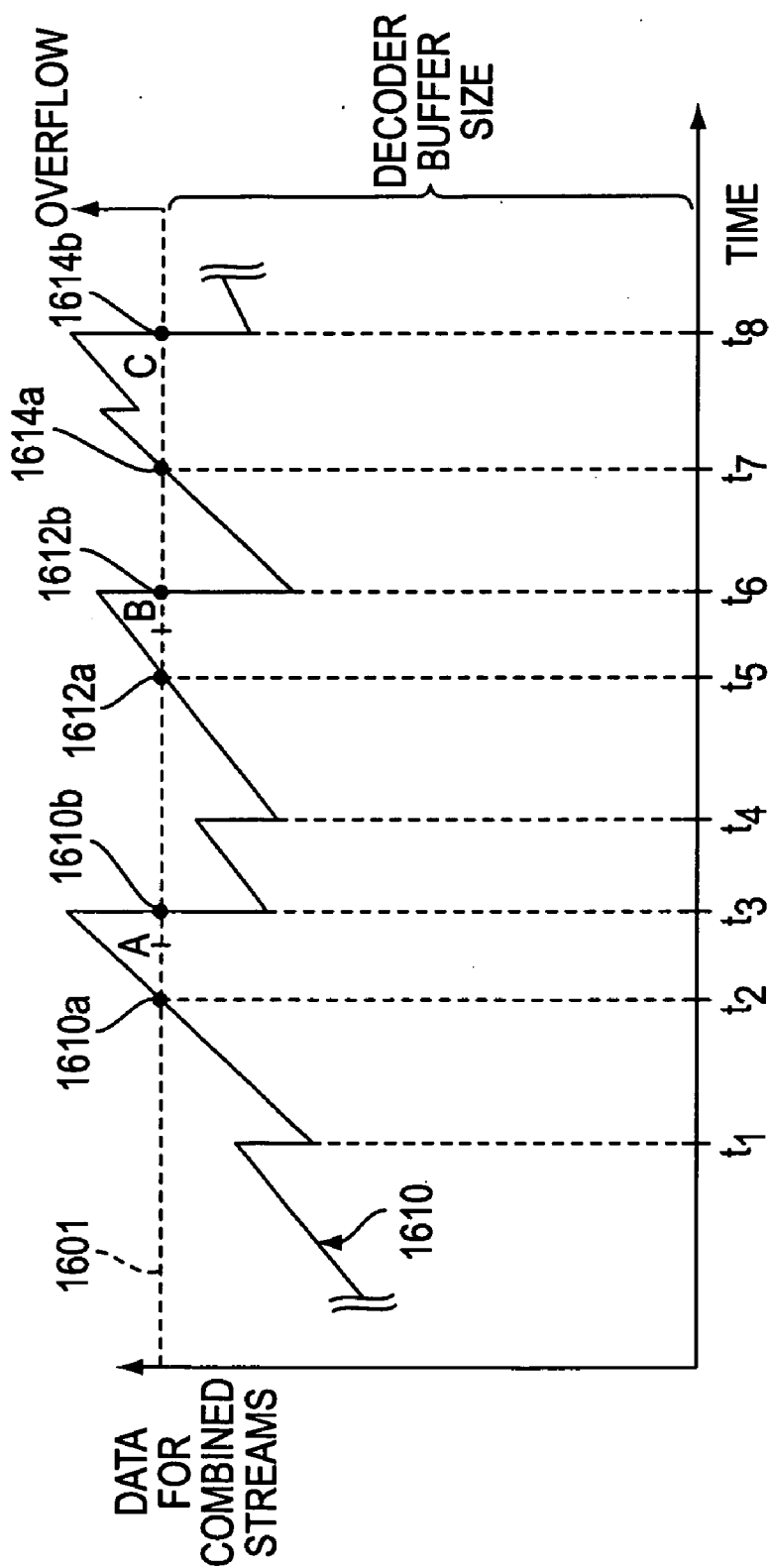
FIG. 16 is a graph illustrating overflow characteristics and further illustrating detection and removal of overflow in accordance with the preferred methods of FIGS. 15a through 15c, according to the invention.
Figure 17:
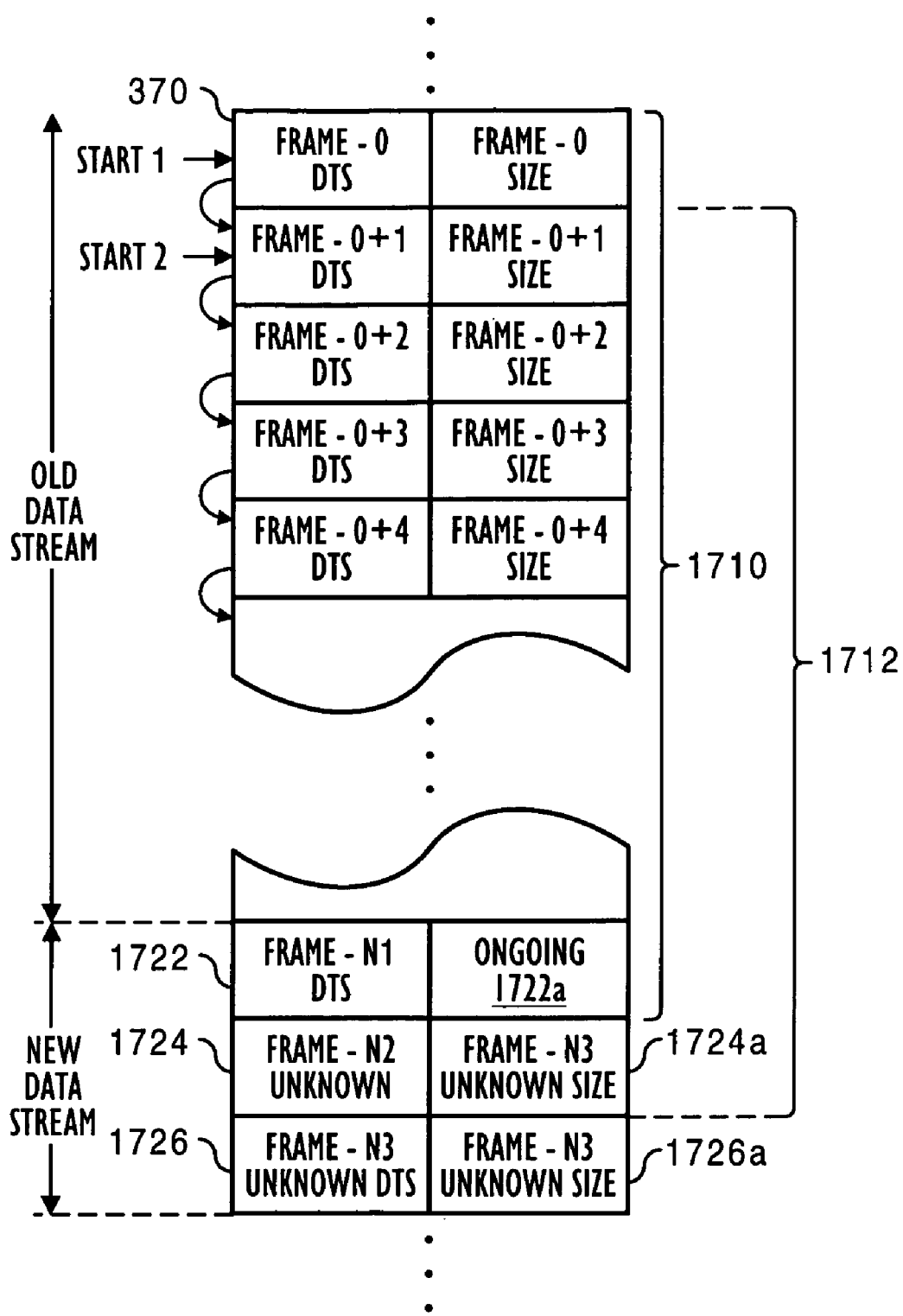
FIG. 17 illustrates exemplary contents of a splice table in accordance with the preferred methods of FIGS. 15a through 15c, according to the invention.

The FIGS. 14 through 15*c* flowcharts, with reference to FIGS. 11, 16 and 17, illustrate how a preferred splicer according to the invention preferably detects and corrects decoder input buffer overflow conditions otherwise caused by splicing (step 450 of FIG. 4).

Referring first to FIG. 11, the last decoder buffer of the old data stream 1801 will be transmitted to the decoder before time t2. While the old data stream continues to decode or "play out" (from time t2 to time t4), the first decoder buffer of the new data stream 1102*a* (after a preferred alignment) will be continually received by the decoder input buffer. Therefore, from time t2 to time t4, essentially continually varying amounts of both data streams will be present in the decoder input buffer, with the old data stream amount decreasing and the new data stream amount increasing. The first decoder buffer of the new data stream will then continue to be received by the decoder until new data stream decoding begins at t5 (i.e. the new data stream splice-in point). These described conditions would, of course, occur in the absence of overflow correction.

The FIG. 16 graph also illustrates an exemplary portion of old and new data stream data in a decoder input buffer. As compared with FIG. 11 however, only a portion of the old data stream's last decoder buffer is depicted. In addition, a more informative data stream example is shown and the old data stream data and new data stream data are illustrated in a combined fashion. FIG. 16 shows how the presence of the combined data streams in the decoder input buffer causes the decoder input buffer size to be exceeded, resulting in "decoder overflow conditions" (i.e. of the video decoder input buffer) A, B and C. Unfortunately, unless corrected, each overflow condition will result in a loss of data stream data.

The FIG. 14 flowchart broadly illustrates a preferred method for removing overflow conditions, according to the invention. As shown, if, in step 1410, splicer-N 270 (FIG. 3) finds an overflow condition resulting from a splice, then, in step 1420, splicer-N 270 delays the data stream portion causing the overflow condition by a delay amount. Splicer-N 270 then accelerates a later data stream portion by an amount corresponding to the delay amount in step 1430. As will be further discussed, splicer-N 270 preferably delays a data stream portion during overflow correction by inserting null packets at the start of the splice buffer in which the overflow condition (or simply "overflow") occurs. Splicer-N 270 further preferably accelerates a data stream portion during overflow correction by deleting null packets at or near the start of a corresponding splice buffer full. (As was discussed earlier, a data buffer typically contains 10 percent or more null packets as a result of encoding, such that a lack of sufficient null packets for deletion during overflow correction has not been observed.)

In addition, splicer-N 270 preferably localizes data stream modifications in the form of null packet insertion and/or deletion to those portions of the data stream in which overflow is actually detected. More particularly, only the new data stream is modified as needed and, within the new data stream, only those splice buffers in which an overflow is detected and/or immediately preceding and/or following such splice buffers are modified.

It will be understood by those skilled in the art, in view of the teachings herein, that null pack insertion could alternatively be effectuated at locations in the data stream other than the start of a splice buffer. Examples include but are not limited to insertion just prior to a data packet in which an overflow is detected. However, while such placement might more accurately correct an overflow condition, the preferred method is observed to result in similarly effective overflow avoidance and is more readily accomplished in real-time by a splicer implemented as a library. Similar placement alternatives will also be apparent with regard to null packet deletion. Such placement alternatives are contemplated where, for example, a splicer is implemented as other than a library, and therefore, has more direct control capability with little or no increased overhead.

Returning now to FIG. 16, a preferred splicer-N 270 more specifically detects overflow conditions by preferably determining points along combined data stream curve 1610. As shown, determining points along such a curve will reveal the start of overflow conditions at times t2, t5 and t7. While it might appear that a next step might include calculating the amount of data by which decoder input buffer capacity is exceeded (and such a step has been utilized), it is discovered that correction in accordance with buffer exceeding amounts of data stream data can lead to inaccurate results. It is believed that such potential inaccuracies occur due in large part to the existence of video, audio and other information within a common data stream. Accurate results have, however, been produced by measuring the length of an overflow condition and, more particularly, by counting the number of data packets that would be received by a decoder input buffer during the overflow condition. For similar reasons of mixed data types, the data stream data is also preferably parsed for video data bytes, which are then counted on a frame-by-frame basis.

As discussed, splicer-N 270 (FIG. 3) preferably functions, in part, by parsing through old data stream data and then new data stream data that is sequentially provided in splice buffer-N 265 on a buffer-full by buffer-full (or equivalently, splice buffer-by-splice buffer) basis approximately 1 second before transmission. Splicer-N 270 therefore preferably performs each of the discussed functions (e.g. finding splice-in and splice-out points) while splice buffer-N 265 contains a corresponding data stream portion (e.g. the end of the old data stream or the start of the new data stream). Splicer-N 270 further, in conjunction with splice-in, splice-out, PCR and alignment determination, creates splice table 370 and then populates splice table 370 with data for use in detecting and correcting overflow (see step 405 of FIG. 4).

It has been observed that more than one overflow condition might exist not only during successive splice buffers, but also during a single splice buffer. Splicer-N 270 therefore completely searches each splice buffer to reveal all overflow conditions that might exist within the splice buffer.

It has also been observed, that overflow occurrences within the same splice buffer should not be corrected in isolation. For example, while it might be expected that each such overflow should be avoided by correspondingly inserting null packets, such multiple insertions have been observed to result in decoder buffer underflow in some cases. Splicer-N 270 therefore preferably completes overflow testing/detection within an entire splice buffer before performing correction. More particularly, splicer-N 270 preferably determines the longest persisting overflow condition within a splice buffer and then inserts a corresponding number of null packets prior to the splice buffer.

It should be further noted that preferred library-based splicer-N 270 preferably adds and deletes null packets during overflow correction in the manner already discussed. More particularly, data packets are added by returning an add instruction to a host application along with a number of null packets to be added. Contrastingly, splice buffer-N 270 deletes null packets from splice buffer-N 265 directly.

The FIGS. 15a to 15c flowchart, with reference to the exemplary frame table of FIG. 17, illustrates in greater detail a preferred method for detecting and removing overflow conditions. FIG. 15a illustrates a preferred method for populating frame table 265 (FIG. 3) with an old data stream, while FIGS. 15b and 15c illustrate preferred methods for populating frame table 265 with new data stream data, and detecting and removing detected overflow conditions.

As shown in FIG. 15a, splicer-N 270 preferably begins overflow handling by populating splice table-N 370 with the DTS and size of old data stream video frames contained in splice buffer-N 265. While splicer-N 270 preferably begins essentially immediately upon activation, splicer-N 270 need only begin sufficiently early to assure that splice table 370 contains complete data for the last decoder buffer of the old data stream. Splicer-N 270 parses splice buffer-N 265 for sequence, GOP, packet and frame data in the manner already discussed. As noted, splicer-N 270 further preferably determines frame size by counting video frame data bytes within each packet contained in splice buffer-N 265.

More particularly, if, in step 1501, splice buffer-N 265 contains a new splice buffer of old data stream data, then splicer-N 270 parses splice buffer-N 265 for a first frame (i.e. now the "current frame") in step 1503. Next, splicer-N 270 retrieves the DTS for the current frame in step 1505, and stores the retrieved DTS in the next location of frame table-N 370 in step 1507. If, in step 1509, more data remains in splice buffer-N 265, then splicer-N 270 gets the next data packet in splice buffer-N 265 in step 1510, and determines whether the current packet is a new frame in step 1511. If, in step 1511, the current packet is a new frame, then splicer-N 270 stores the size of the prior video frame in splice table-N 370 and returns to step 1505; otherwise splicer-N 270 adds the number of video data bytes in the current packet to an ongoing total for the current frame in step 1513, and then returns to step 1509.

If, in step 1509, no more data remains in splice buffer-N 265, then splicer-N 270 proceeds to step 1514. If, in step 1514, splice buffer-N 265 does not contain the last splice buffer of old data stream data, then splicer-N 270 proceeds to step 1501. If instead, in step 1514, splice buffer-N 265 contains the last splice buffer of old data stream data, then splicer-N 270, in step 1515, initializes a pointer "first" to point (in frame table-N 370) to the location of the first frame of the last decoder buffer of the old data stream.

Proceeding in FIG. 15b with regard to the new data stream, splicer-N 270 preferably first determines the buffer which may not be exceeded (i.e. overflowed) by the addition of new data stream data to old data stream data already contained in a decoder input buffer. More particularly, in step 1521, splicer-N 270 sets a variable "size" to the value of the vbv_buffer_size field within the first sequence header of the new data stream. While the vbv_buffer_size value does not necessarily reflect the total available size of each receiving decoder input buffer (which may vary), it does represent the maximum buffer size anticipated during new data stream encoding. Therefore, splicer-N 270, by assuming such a size, assures that overflow will not occur where overflow would not have occurred without splicing (i.e. where only one encoded data stream would occupy a decoder input buffer. In step 1523, splicer-N 270 further initializes a variable "add nulls" for use in deciding whether to add nulls, and if so, how many nulls to add.

FIG. 17 illustrates how buffer table-N 370 is used to detect overflow by way of example. As shown, at this point splicer-N 270 has already found (in successive splice buffers) and correspondingly filled frame table-N 370 with each of the DTSs and frame sizes for the old data stream. Splicer-N 270 has also already set the start pointer to point to the first frame of the last decoder buffer of the old data stream. With regard to the new data stream however (in the lower portion of the table as shown), splicer-N 270 will begin by ascertaining the DTS for the first frame and will then begin determining the frame size for the first frame. Until splicer-N 270 completes this size determination, the size is simply "ongoing"; upon completion (through detection of a next frame, the current frame size will become fixed.

Concurrently with frame calculation, splicer-N 270 will test for and correct for overflow. Since a properly encoded data stream would not alone cause overflow, the size values for the old data stream can be summed together without testing for overflow. However, overflow might occur due to yet unknown ones of new data stream data packets. Therefore, splicer-N 270 preferably tests for overflow (i.e. exceeding the vbv_buffer_size) at the completion of ongoing size determination following parsing of each packet. Once fixed, a new data stream frame size can be summed directly along with old data stream frame sizes. It should be noted, however, that MPEG-2 encoded frames may begin and end across frame buffer and even packet boundaries, while overflow determinations and corrections are preferably performed on a splice buffer-by-splice buffer basis.

Brackets 1710 and 1712 along with start pointer incrementing illustrate how testing for overflow is preferably conducted beginning with each successive frame of the old data stream. For clarity sake, the FIGS. 15a to 15c flowcharts assume that an overflow will be resolved by each old data stream decode. Returning to the FIG. 16 graph, overflow conditions A and B, which represent all overflow conditions discovered thus far, illustrate such decoder resolution of an overflow. It should be noted, however, that overflow conditions in which decoding does not cure an overflow (e.g. overflow C) are also possible. Thus, to avoid overlooking such an overflow, the size of each decoded frame should be subtracted from a current size determination and a test should again be performed to determine whether overflow persists. If so, then the determination of the number of packets during the course of the overflow should be continued. Given the additional time and space requirements, however, testing for overflow C type occurrences is preferably selectively provided.

It will be understood by those skilled in the art, in view of the teachings herein, that the specific splice table structure and specific method parameters may be modified without departing from the spirit and scope of the invention.

Returning to FIG. 15b, in step 1525, splicer-N 270 sums all known video-frame sizes in splice table-N 370, beginning with the location indicated by the start pointer. In step 1527, splicer-N 270 enters the DTS for the first frame of the new data stream into splice table-N 370 and initializes the frame size equal to 0. In step 1529, splicer-N 270 gets the total number of video data bytes in the current packet of splice-buffer-N 265, further adding the number to the frame size for the current frame.

If, in step 1531, the additional new data stream data bytes result in an overflow condition, then splicer-N 270 proceeds to step 1551 (FIG. 15c); otherwise, splicer-N 270 continues at step 1533.

If, in step 1533, the PCR value for the current data packet of the new data stream is greater than or equal to the DTS of the start frame (of the old data stream), then an old data stream decode will occur and overflow detection can be resumed with respect to the next old data stream frame, as given by step 1535. If instead, in step 1533, the PCR value is not greater than or equal to the current start frame DTS, then splicer-N 270 skips step 1535 and continues at step 1537.

If, in step 1537, the end of splice buffer-N 265 has been reached, then splicer-N 270 continues at step 1557 (of FIG. 15c); otherwise, splicer-N 270 continues with video byte counting in step 1539 by totaling the video-bytes in the next packet or, if a new frame is reached, entering the frame size total in frame table 370, re-initializing the current frame size, and proceeding to step 1531.

FIG. 15c starts at step 1551 in response to the start of a detected overflow condition. As discussed, splicer-N 270 will preferably then determine the number of packets during which the overflow condition persists during the current buffer and add a number of null packets equal to the greatest such persistence within the current splice buffer. In step 1551, splicer-N 270 gets the packet number for the current packet (from the current packet header). In step 1553, splicer-N 270 gets the number of video bytes from the next packet or (as before), if the next packet begins a new frame, then splicer-N 270 enters the prior frame size into buffer table-N 370 and re-initializes the current frame size.

If an overflow condition has been reached and, in step 1555, the end of the current splice buffer has not been reached, then splicer-N 270 proceeds at step 1565. If instead, and overflow condition has been reached and, in step 1555, the end of the current splice buffer has been reached, then splicer-N 270 adds a number of null packets to before the current splice buffer that is equal to the largest number of packets during which an overflow has persisted during the current splice buffer in step 1557 and proceeds to step 1559.

If, in step 1559, an end condition has been reached, then the splice is completed; otherwise, splicer-N 270 continues with step 1561. Splicer-N 270 preferably determines an end condition as occurring when the new data stream will continue as encoded (i.e. prior to any modifications made during splicing). Therefore, if the encoded new data stream began with a closed GOP, then an end condition is reached when a PCR for a current packet of a current splice buffer is equal to or larger than the last DTS of the encoded old data stream. If however, splicer-N 270 closed an open GOP at the start of the new data stream (i.e. while finding a video splice-in point), then an end condition is reached when splicer-N 270 finds a DTS n+1 frames into the new data stream, where n is the number of frames dropped by splicer-N. For example, if splicer-N 270 closed a GOP by dropping 2 frames, then an end condition is reached when splicer-N 270 finds the DTS for the third frame of the new data stream.

In step 1561 (i.e. where an overflow was found and the end of the current splice buffer has been reached, but an end condition does not exist), splicer-N 270 subtracts a number of nulls from the beginning of the next splice buffer and re-initializes the null count. Next, in step 1563, splicer-N 270 begins testing the new splice buffer for overflow by getting a size for the next (in this case, the first) packet of the splice buffer, or, if a new frame is found, then entering the old frame size into buffer table-N 370 and initializing the new frame size as zero bytes. Splicer-N 270 then continues with step 1531 (of FIG. 15b).

While a preferred splicer preferably follows a splice buffer to which null packets have been added by deleting the same number of null packets from the following splice buffer, those skilled in the art will appreciate, in view of the teachings herein that restoring schemes other than an immediate deletion can be substituted. As discussed, restoring the remainder of the new data stream to its encoded form prior to the conclusion of splicing serves to avoid further overflow, underflow and/or other anomalies after splicing without requiring ongoing intervention. Therefore, adding nulls is preferably followed by deleting nulls (i.e. thereby restoring the encoded stream). Deletions should further follow additions in sufficiently close proximity to avoid, for example, so much of a delay as to cause underflow. Examples of variations however, include but are not limited to a less close proximity between a specific addition and deletion is one buffer and it is assumed that the same buffer cannot cause overflow and underflow.

Returning now to FIG. 15c, in step 1565, splicer-N 270 gets a size for the next packet of the splice buffer, or, if a new frame is found, then enters the old frame size into buffer table-N 370 and initializes the new frame size. Splicer-N 270 then continues with step 1567. If, in step 1567, the end of the current splice buffer has been reached, then splicer-N 270 continues at step 1557; otherwise, splicer-N 270 continues at step 1569. If, in step 1569, the PCR value for the current packet of the current splice buffer is greater than or equal to the DTS of the start frame, then splicer-N 270 adds a number of null packets before the current splice buffer that is equal to the greatest number of packets during which an overflow persisted during the current splice buffer in step 1571 and then proceeds to step 1563; otherwise, splicer-N 270 skips step 1571 and proceeds to step 1563.

Figure 18:
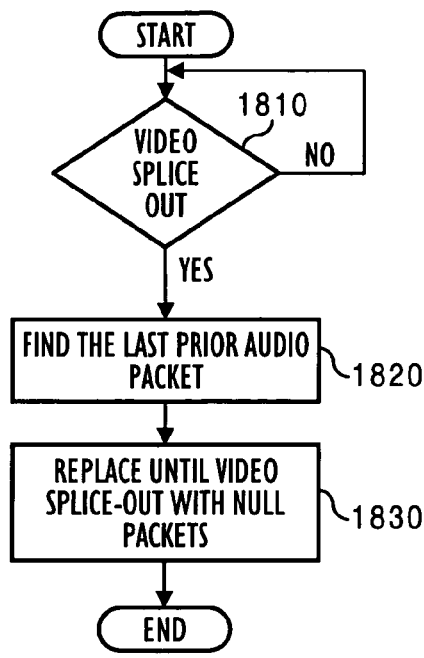
FIG. 18 is a flowchart illustrating a preferred method for setting an audio splice-out point of a first data stream, according to the invention.
Figure 20:
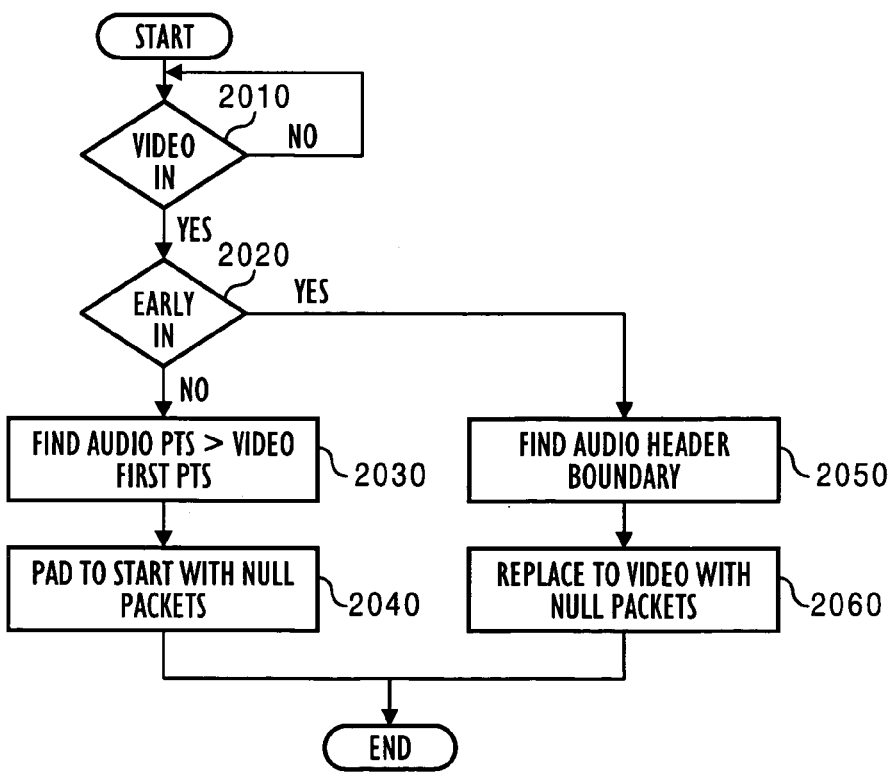
FIG. 20 is a flowchart illustrating a preferred method for setting a splice-in point in a new data stream, according to the invention.

Turning now to FIGS. 18 through 20, splicer-N 270 provides audio splicing in conjunction with video splicing. More particularly, splicer-N 270 finds an old data stream audio splice-out point after finding a video splice-out point (step 410 of FIG. 4), and similarly finds a new data audio splice-in point after finding a video splice-in point (step 420 of FIG. 4).

The FIG. 18 flowchart illustrates a preferred method for setting an audio splice-out point in the old data stream. As shown, if a video splice out point has been found in step 1810, then, in step 1820, splicer-N 270 parses splice buffer-N 265 (FIG. 3) for the last prior audio packet. Next, in step 1830, splicer-N 270 fills the gap produced between the audio splice point and the video splice out point that follows with null packets.

Figure 19A:
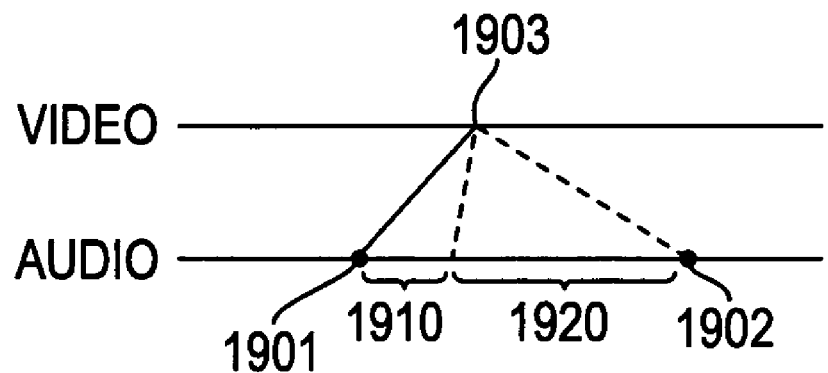
FIG. 19a illustrates audio splice out point alternatives, according to the invention.

As shown in the FIG. 19*a* graph, the FIG. 18 method ends audio at point 1901, prior to the conclusion of the video before the splice. While such a splice out produces silence before the video image ends, the resultant 20–30 msec of silence is considered acceptable. Alternatively, assuring that silence will not be produced (by matching the audio PTS with the video PTS) produces the problem that audio 1902 will persist after the video has ended. In addition, the excess of audio data will more likely produce overflow of the audio buffer.

Figure 19B:
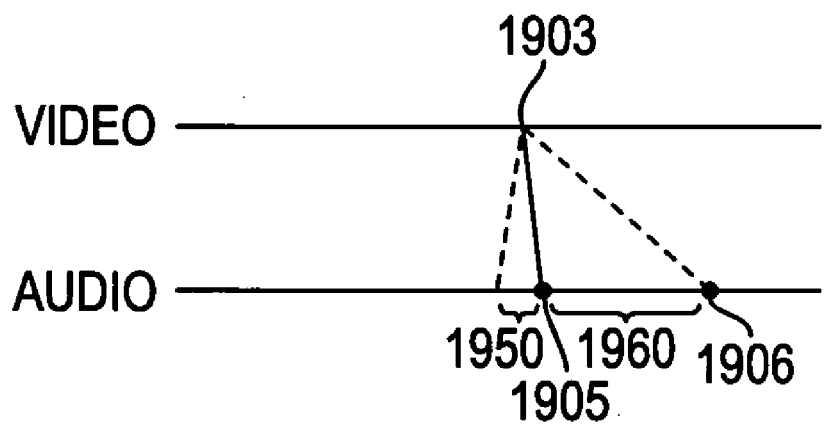
FIG. 19b illustrates audio splice in point alternatives, according to the invention.

The FIG. 20 flowchart, with reference to FIG. 19*b*, illustrates a preferred method for setting an audio splice-in point in the new data stream. As shown, if a video splice in point has been found in step 2010 and an early out option has been selected in step 2020, then, in step 2050 splicer-N 270 finds an audio header boundary following the video splice-in point (1905 of FIG. 19*b*). Since a period of silence will exist after the video has started, splicer-N 270, in step 2060, replaces the missing audio packets (1950 of FIG. 9*b*) with null packets. If instead, in step 2020, a PTS matching option has been selected, then, in step 2030, splicer-N 270 finds a first audio PTS greater than the video PTS and replaces or "pads" the period of silence until the start of audio (1960 of FIG. 19*b*) with null packets in step 2040. Once again, the short period of silence of the early out option is preferable.

Figure 21:
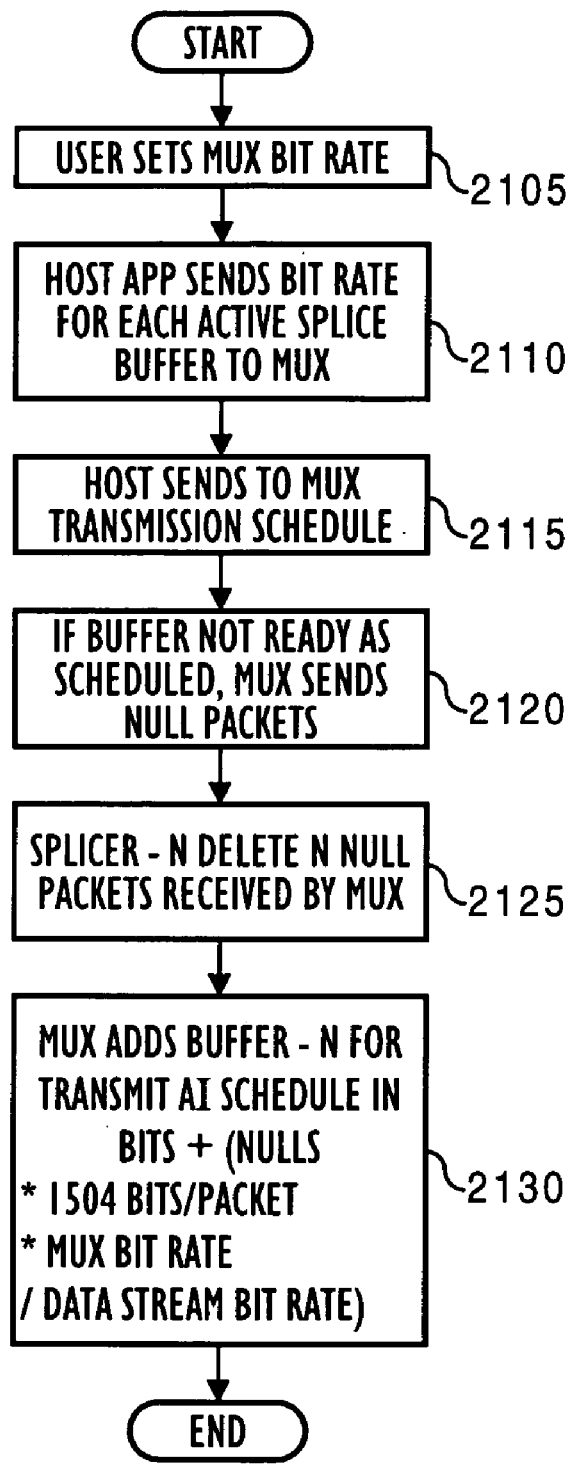
FIG. 21 is a flowchart illustrating a preferred splicer utilizing a bit clock according to a further preferred embodiment of the invention.
Figure 22:
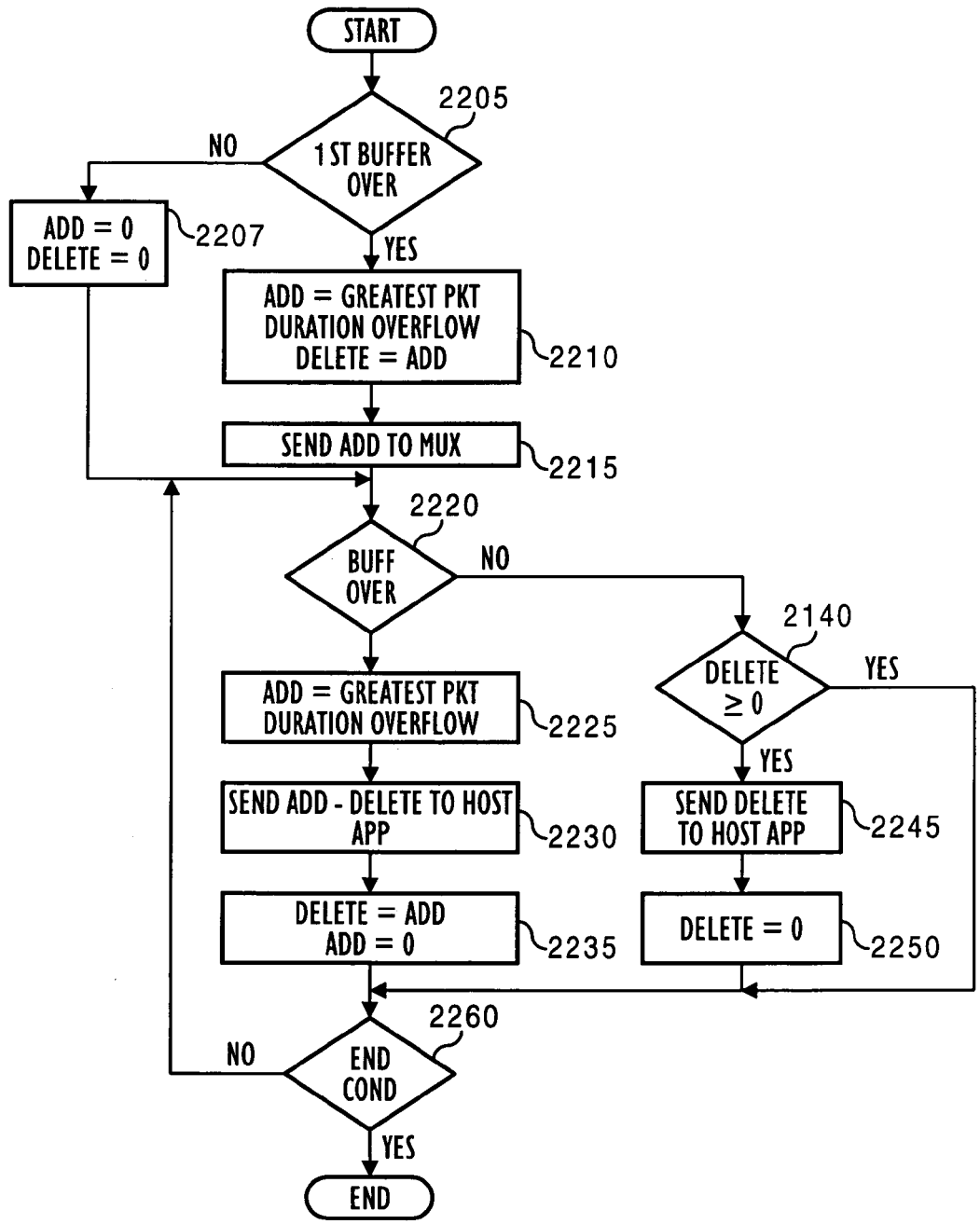
FIG. 22 is a flowchart illustrating enhancements to the FIGS. 15a through 15c preferred method for detecting and correcting overflow conditions, according to the invention.

FIGS. 21 and 22 illustrate a further preferred embodiment of the invention. Broadly stated, the present embodiment provides a splicer that performs splices in a manner similar to that of the prior embodiment splicer; the present embodiment splicer, however, functions in conjunction with a preferably multiplexer-implemented "bit clock". Through the use of such a bit clock and other related benefits, a preferred splicer enables processing requirements for performing a splice to be substantially reduced.

Conventionally, a channel multiplexer operates in a repetitive fashion, receiving data stream data sequentially, multiplexing the data streams and routing the multiplexed data to a transmitter. In such a system, data streams must be completely processed prior to receipt by the multiplexer. It is discovered however, that a common timing basis can be established between a splicer and the multiplexer such that the multiplexer can facilitate splicer operation.

FIG. 21 illustrates generally how the bit clock operates in conjunction with splicer operation. As shown, in step 2105, a user sets a multiplexer bit rate. In step 2110, the host application sends multiplexer 190 (FIG. 2) the transmission bit rates for each of the active splice buffers. In step 2115, a host application sets a buffer transmission schedule, according to the ratio of channel bit rate to multiplexer bit rate. In step 2120, multiplexer 190 sends null packets where splice buffer-N 265 is not ready to transmit as scheduled. In step 2125, a splicer-N 270 delete n null packets instruction is received by multiplexer 190 via the host application along with splice buffer-N 265 contents. (The value of n will be negative for a delete null packets instruction and positive for an add null packets instruction.) In step 2130, multiplexer 190 routes splice buffer-N 265 contents to a transmitter (which immediately transmits the splice buffer at a time indicated by $$\text{transmit} = \text{schedule(bits)} + \frac{n(\text{packets}) * 1504(\text{bits/packet}) * \text{multiplexer bit rate}}{\text{data stream bit rate}}$$

It should be noted that splicer-N 270 not only accelerates a splice buffer using substantially less processing power than the multiple copying method for deleting null packets of the prior embodiment (FIGS. 13*a* and 13*b*). In addition, splicer-N 270 can function in the same manner as the prior, embodiment. It is also observed that, since splicer-N 270 effectuates delays (i.e. add nulls) and acceleration (i.e. delete nulls) in the same manner, further optimization can be achieved.

The FIG. 22 flowchart illustrates how the present splicer preferably optimizes the overflow detection and correction methods set forth in FIGS. 14 through 15*c*. Broadly stated, in contrast with the FIGS. 15*a* through 15*c* method of separately restoring the new data stream and then correcting overflow with regard to the same splice buffer, the present splicer preferably provides only one instruction per splice buffer. In addition, the present splicer preferably functions in conjunction with the bit clock to shift transmission of a splice buffer rather than deleting and adding null packets, as according to the prior methods.

As shown, if, in step 2205, splicer-N 270 detects one or more overflow conditions by parsing the first splice buffer of the new data stream, then, in step 2210, splicer-N 270 sets add-nulls equal to the greatest packet duration overflow (as in the prior embodiment) and further sets delete-nulls equal to add nulls. Delete nulls is used with the next splice buffer to restore the new data stream. Next, in step 2215, splicer-N 270 sends an "add null packets" instruction to multiplexer 190 via the host application. If instead, in step 2205, no overflow condition is detected, then splicer-N 270 sets add-nulls and delete-nulls to zero in step 2207.

If in step 2220, splicer-N 270 detects an overflow condition while parsing a next splice buffer, then splicer-N 270 stores the number of packets during the greatest duration overflow for the splice buffer in step 2225, sends the difference between the overflow-correcting and stream-resolving null packet values to the host application (i.e. add and delete null packets respectively) in step 2230, and sets delete equal to add and then add equal to zero in step 2235. As discussed, splicer-N 270 thus preferably provides only one combined instruction for the splice frame. If, in step 2260, splicer-N 270 has not reached an end condition (as discussed earlier), then splicer-N 270 proceeds to step 2220.

If, in step 2220, splicer-N 270 does not detect an overflow condition while parsing a next splice buffer, then splicer-N proceeds to step 2140. If, in step 2140, delete-nulls equals zero, then splicer-N 270 proceeds to step 2260. If instead, in step 2140, delete-nulls is not equal to zero, then splicer sends a corresponding delete nulls instruction to the host application in step 2245 and sets delete-nulls equal to zero in step 2250.

It will be appreciated by those skilled in the art, in view of the foregoing, that both of the embodiments described herein are also applicable where the old and new data streams are otherwise dissimilarly or similarly encoded. For example, a preferred splicer can further selectively utilize and/or set a common time reference, such as a common PCR. Either splicer can also be configured to communicate directly with an output device, such as multiplexer 190 (FIG. 2). In addition, the discussed conversion from null packets to a bit-clock schedule offset can be effectuated by the splicer and/or a host application.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth.

I claim:

1. A method for splicing digitally encoded data streams, including an old data stream and a new data stream, comprising:
   (a) without the use of a clock reference signal, modifying a current timing reference of the new data stream to correspond with a splice-out point of the old data stream and a splice-in point of the new data stream, thereby forming a modified new data stream timing reference, wherein said modified new data stream timing reference further corresponds with a timing gap between a first decoding time for decoding a last frame of the old data stream and a second decoding time for decoding a first frame of the new data stream; and
   (b) aligning a portion of the new data stream with a portion of the old data stream according to said modified new data stream timing reference, such that a transition from the old data stream to the new data stream, during playback, will be substantially imperceptible.

2. The method according to claim 1, wherein determining said modified new data stream timing reference includes:
   (i) determining said current timing reference of the new data stream;
   (ii) determining a delay between said current timing reference and a current decoding time of a frame of the new data stream;
   (iii) determining a new decoding time of said frame of the new data stream that corresponds with a sum of said current decoding time and an inter-frame delay between a decoding time for decoding a last frame of the old data stream and a decoding time for decoding a first frame of the new data stream; and
   (iv) determining said modified new data stream timing reference as said new decoding time of step (iii) minus said delay of step (ii).

3. The method according to claim 1, wherein determining said modified new data stream timing reference includes:
   (i) determining a program clock reference of a first packet of said new data stream;
   (ii) determining a delay between transmission of a first sequence header of said new data stream and a first decode time stamp DTS of a first frame of said new data stream;
   (iii) determining a continuous DTS as a sum of said first DTS and an inter-frame delay; and
   (iv) determining a new data stream real-time transmit time as said continuous DTS of step (iii) minus said delay of step (ii).

4. The method according to claim 1, wherein said aligning in step (b) sets a start time for transmitting the portion of the new data stream that corresponds with a decoding time for decoding the portion of the old data stream.

5. The method according to claim 1, wherein said aligning in step (b) sets a start time for a decoder buffer to begin receiving the portion of the new data stream that corresponds with a decoding time for decoding the portion of the old data stream.

6. The method according to claim 1, further comprising:
   (c) detecting a decoder buffer overflow condition that will result from said splicing, if the data streams are transmitted; and
   (d) correcting said overflow condition.

7. A method for splicing digitally encoded data streams, including an old data stream and a new data stream, comprising:
   without the use of a clock reference signal, modifying a current timing reference of the new data stream to correspond with a splice-out point of the old data stream and the splice-in point of the new data stream, thereby forming a modified new data stream timing reference; and
   aligning a portion of the new data stream with a portion of the old data stream according to said modified new data stream timing reference, such that a transition from the old data stream to the new data stream, during playback, will be substantially imperceptible.

8. The method according to claim 7, including the steps of:
   determining a splice-out point of the old data stream; and
   determining a splice-in point of the new data stream.

9. The method according to claim 8, wherein the step of determining the splice-out point includes, if an initial frame of the new data stream is of a type that is ordinarily decoded with reference to decoding of a prior frame, then mod ng the new data stream to remove said reference.

10. The method according to claim 9, wherein said frame type is selected from a group consisting of B-frames and P-frames, and wherein said step of modifying comprises closing an open group of pictures GOP.

11. The method according to claim 8, wherein said data streams include video and audio data, wherein the step of determining the splice-out point includes determining a video splice-out point and an audio splice-out point, and wherein step (iv) includes determining a video splice-in point and an audio splice-in point.

12. The method according to claim 8, wherein said splice-out point is determined within a user-selectable portion of the old data stream.

13. The method according to claim 8, wherein said splice-in point is determined within a user-selectable portion of the new data stream.

14. The method according to claim 8, wherein said splice-out point is user-selectable.

15. The method according to claim 8, wherein said splice-in point is user-selectable.

16. A method for splicing digitally encoded data streams, including an old data stream and a new data stream, comprising:
   (i) determining a first source for the old data stream and a second source for the new data stream;
   (ii) modifying a current timing reference of the new data stream to correspond with a splice-out point of the old data stream and a splice-in point of the new data stream, thereby forming a modified new data stream timing reference; and
   (iii) without the use of a clock reference signal, aligning a portion of the new data stream with a portion of the old data stream according to said modified new data stream timing reference, such that a transition from the old data stream to the new data stream, during playback, will be substantially imperceptible.

17. The method according to claim 16, wherein said first and second sources include source types selected from a group comprising a storage device, a satellite receiver, a cable receiver, a network, an audio source, a video source and an encoder.

18. The method according to claim 17, wherein said first source and said second source are of a same source type.

19. A method for splicing digitally encoded data streams, including an old data stream and a new data stream, comprising:
  (a) without the use of a clock reference signal, modifying a current timing reference of the new data stream to correspond with a splice-out point of the old data stream and a splice-in point of the new data stream, thereby forming a modified new data stream timing reference, wherein at least one of said data streams is MPEG encoded; and
  (b) aligning a portion of the new data stream with a portion of the old data stream according to said modified new data stream timing reference, such that a transition from the old data stream to the new data stream, during playback, will be substantially imperceptible.

20. The method according to claim 19, wherein step (a) is followed by transmitting a portion of the old data stream.

21. The method according to claim 19, wherein step (a) is followed by transmitting a portion of the old data stream.

* * * * *